(12) United States Patent
Nakadaira et al.

(10) Patent No.: US 12,314,349 B2
(45) Date of Patent: May 27, 2025

(54) CONTENT CONTRACT SYSTEM, CONTENT CONTRACT METHOD, AND CONTROL TERMINAL

(71) Applicant: Nippon Telegraph and Telephone Corporation, Tokyo (JP)

(72) Inventors: Atsushi Nakadaira, Tokyo (JP); Hiroki Watanabe, Tokyo (JP); Shigeru Fujimura, Tokyo (JP); Shigenori Ohashi, Tokyo (JP); Tatsuro Ishida, Tokyo (JP); Kota Hidaka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 851 days.

(21) Appl. No.: 17/286,022

(22) PCT Filed: Oct. 4, 2019

(86) PCT No.: PCT/JP2019/039309
§ 371 (c)(1),
(2) Date: Apr. 16, 2021

(87) PCT Pub. No.: WO2020/080145
PCT Pub. Date: Apr. 23, 2020

(65) Prior Publication Data
US 2021/0390161 A1    Dec. 16, 2021

(30) Foreign Application Priority Data
Oct. 19, 2018 (JP) ................................. 2018-197925

(51) Int. Cl.
G06F 21/10 (2013.01)
H04L 9/32 (2006.01)
H04L 9/00 (2022.01)

(52) U.S. Cl.
CPC ............ G06F 21/10 (2013.01); H04L 9/3236 (2013.01); H04L 9/50 (2022.05)

(58) Field of Classification Search
CPC .......... H04L 9/3236; H04L 9/50; G06F 21/10
See application file for complete search history.

(56) References Cited

U.S. PATENT DOCUMENTS 9,319,223 B2 * 4/2016 Nix .......................... H04L 9/321
10,805,090 B1 * 10/2020 Poelstra .................... H04L 9/50
(Continued)

OTHER PUBLICATIONS

Zhaofeng Ma, Ming Jiang Hongmin Gao Zhen Wang, "Blockchain for digital rights management", Future Generation Computer Systems, vol. 89, Dec. 2018, pp. 746-764 (Year: 2018).*

(Continued)

Primary Examiner — Gary S Gracia
(74) Attorney, Agent, or Firm — Fish & Richardson P.C.

(57) ABSTRACT

A blockchain is used to distribute a right to content data. A right holder terminal, an assignee terminal, and a blockchain control terminal stores a blockchain that is synchronized among the right holder terminal, the assignee terminal, and the blockchain control terminal. The blockchain includes a transaction set with a smart contract program for distributing the right. The blockchain control terminal includes a token issuance unit generating token data that includes match information for the content data and a type of right to be distributed, is set with an address of a right holder as owner information, and is identified by a token identifier, and registering the token data corresponding to the token identifier with the blockchain.

10 Claims, 13 Drawing Sheets

(56) References Cited

U.S. PATENT DOCUMENTS

| | | | |
|---|---|---|---|
| 2011/0055585 A1* | 3/2011 | Lee | H04L 9/3226 713/183 |
| 2011/0302646 A1* | 12/2011 | Ronda | H04L 9/3268 726/9 |
| 2012/0204254 A1* | 8/2012 | Voss | G06F 21/57 726/18 |
| 2013/0046995 A1* | 2/2013 | Movshovitz | H04L 9/0662 713/189 |
| 2016/0085955 A1* | 3/2016 | Lerner | H04L 9/0869 726/20 |
| 2017/0109955 A1* | 4/2017 | Ernest | G07C 13/00 |
| 2018/0309567 A1* | 10/2018 | Wooden | H04L 63/12 |
| 2019/0102782 A1* | 4/2019 | Diehl | H04L 9/3247 |
| 2019/0140837 A1* | 5/2019 | Cheng | H04W 8/20 |
| 2019/0205894 A1* | 7/2019 | Gonzales, Jr. | G06Q 20/3829 |
| 2019/0319798 A1* | 10/2019 | Chalkias | H04L 9/3236 |
| 2019/0333058 A1* | 10/2019 | Hong | H04L 9/0637 |
| 2020/0052880 A1* | 2/2020 | Bathen | H04L 63/102 |
| 2020/0145231 A1* | 5/2020 | Trevethan | H04L 9/085 |
| 2020/0279253 A1* | 9/2020 | Ma | G06Q 20/223 |
| 2020/0286092 A1* | 9/2020 | Zhang | G06Q 20/383 |
| 2020/0313897 A1* | 10/2020 | Heath | H04W 4/40 |
| 2020/0351082 A1* | 11/2020 | Wan | H04L 9/3247 |
| 2021/0119807 A1* | 4/2021 | Chen | H04L 9/3242 |
| 2021/0271982 A1* | 9/2021 | Lee | G06F 16/2365 |
| 2021/0390533 A1* | 12/2021 | Fan | G06Q 20/3825 |

OTHER PUBLICATIONS

Github.com, [online], "Livepeer Whitepaper," Dec. 12, 2018, retrieved on Apr. 12, 2021, retrieved from URL<https://github.com/livepeer/wiki/blob/master/WHITEPAPER.md>, 30 pages.

Viuly.com, [online], "The world's first decentralized video sharing platform—Viuly Whitepaper," available no later than Oct. 4, 2019, retrieved on Oct. 10, 2018, retrieved from URL<https://viuly.com/Viuly_Whitepaper.pdf>, 20 pages.

* cited by examiner

CONTENT CONTRACT SYSTEM, CONTENT CONTRACT METHOD, AND CONTROL TERMINAL

CROSS-REFERENCE TO RELATED APPLICATIONS

This application is a National Stage application under 35 U.S.C. § 371 of International Application No. PCT/JP2019/039309, having an International Filing Date of Oct. 4, 2019, which claims priority to Japanese Application Serial No. 2018-197925, filed on Oct. 19, 2018. The disclosure of the prior application is considered part of the disclosure of this application, and is incorporated in its entirety into this application.

TECHNICAL FIELD

The present invention relates to a content contract system, a content contract method, and a control terminal that distribute a right to content data.

BACKGROUND ART

With the development of information processing technologies, communication networks, and the like in recent years, content data such as video content is generally distributed through content sharing such as video delivery services or Social Networking Services (SNS) (see NPL 1 and NPL 2). In proper distribution of content data, right processing is required by which copyright is appropriately established for a user of the content data or the like and managed.

In some instances, copyright agreements may be established to allow use of content for famous content, content provided by a famous service, and the like. In such a situation, every time content is distributed, a compensation is returned to a copyright holder and therefore a creator of the content, which leads to improvement in motivating creators to create content and the creation of better content.

A system for recording transactions in a distributed ledger such as a blockchain has become popular. The blockchain is shared by a plurality of terminals and is loosely synchronized. The transactions issued by the terminals are bundled into blocks and coupled to the end of the blockchain. A smart contract blockchain is also proposed in which the transaction including a program code is registered within the blockchain, and thereafter, when creating a block, a program specified in the transaction to be included in a block is executed.

In the smart contract blockchain, a transaction set with a program code in a data region is issued, and the program code is registered with the blockchain. After that, to execute the registered program code, a transaction set with input value data of the program in the data region is issued. A terminal to generate the block executes the program code in accordance with the input value data included in the transaction. Execution result of the program code is stored in state data of the blockchain.

CITATION LIST

Non Patent Literature

NPL 1: Doug Petkanics, Eric Tang, "Livepeer Whitepaper," [Online], Livepeer, [Searched on 10 Oct. 2018], Internet URL: https://github.com/livepeer/wiki/blob/master/WHITEPAPER.md NPL 2: Viuly.com, "Viuly Whitepaper," [Online], Viuly.com, [Searched on 10 Oct. 2018], Internet URL: https://viuly.com/Viuly_Whitepaper.pdf

SUMMARY OF THE INVENTION

Technical Problem

However, there are many situations in which copyright agreements are difficult to establish, such as a case that a third party utilizes personally created content, and thus, the content distribution may be inhibited. Also, currently, the content distribution may have to undergo a cumbersome procedure.

Therefore, in order to carry out the right processing, use of a distributed ledger that is capable of non-centralized data management, such as a blockchain, has been proposed as a highly transparent system. However, there are no specific way to distribute the rights in the distributed ledger.

Accordingly, an object of the present invention is to provide a content contract system, a content contract method, and a control terminal that distribute a right for content data using a distributed ledger.

Means for Solving the Problem

In order to solve the above problems, a first feature of the present invention relates to a content contract system that distributes a right to content data. The content contract system according to the first feature of the present invention includes a right holder terminal used by a right holder having the right to the content data, an assignee terminal used by an assignee to which the right is assigned from the right holder, a control terminal verifying a transaction transmitted by the right holder terminal or the assignee terminal, and a content accumulation server connecting to the right holder terminal. The right holder terminal, the assignee terminal, and the control terminal are connected via a P2P network, and a distributed ledger is stored, the distributed ledger including a transaction that is set with a smart contract program to distribute the right, and being synchronized among the right holder terminal, the assignee terminal, and the control terminal. The right holder terminal includes a match information acquisition unit transmitting the content data to the content accumulation server, and acquiring match information for the content data from the content accumulation server, a token issuance transaction transmission unit transmitting a token issuance transaction that issues token data including the match information and a type of a right to be distributed, and acquiring a token identifier for identifying the token data, and an application collection transaction transmission unit transmitting an application collection transaction that includes the token identifier and collects an assignee of the right. The assignee terminal includes an application transaction transmission unit transmitting an application transaction that applies for the application collection transaction. The control terminal includes a transaction processing unit processing the transactions, and the transaction processing unit includes a token issuance unit making the token issuance transaction be included in the distributed ledger, generating token data that includes the match information and the type of the right, is set with an address of the right holder as owner information, and is identified by a token identifier, and registering the token data corresponding to the token identifier in the distributed ledger, an application collection unit making the application collection transaction be included in the distributed ledger, and an application unit making the application transaction be included in the distributed ledger, and changing the owner information of the token data corresponding to the token identifier of the distributed ledger from the address of the right holder to an address of the assignee.

A content providing unit of the content accumulation server may provide the content data with information corresponding to the address of the assignee set in the owner information of the token data.

The content accumulation server may include a content registration unit that receives the content data and calculates the match information for the content data, and the content registration unit may calculate a value of features of the content data as the match information.

In a case that the right is a right for use of the content data, the token data may include an identifier of a sharer by which a compensation obtained by the use is shared and a profit-sharing ratio of each sharer.

In a case that the right is a right for licensing a predetermined right, the token data may include licensee information set with an address of a licensee.

The content accumulation server may include a content providing unit, in response to reception of the token identifier from the assignee terminal, referencing the owner information corresponding to the token identifier of the distributed ledger, and in a case that the owner information is set with the address of the assignee, providing the content data to the assignee terminal.

The content accumulation server may further include an authentication unit transmitting a random number to the assignee terminal in response to reception of an authentication request of the assignee from the assignee terminal, receiving, from the assignee terminal, a signature value given the random number signed with a private key corresponding to the address of the assignee, and verifying the signature value based on the random number, the signature value, and the address of the assignee.

The distributed ledger may be formed by coupling a plurality of blocks in a chain, and the content accumulation server may further include an authentication unit receiving, from the assignee terminal, a signature value given block information of the newest block signed with a private key corresponding to the address of the assignee, and verifying the signature value based on the block information of each of the predetermined number of most recent blocks, the signature value, and the address of the assignee.

The authentication unit, in response to further receiving an identifier of the newest block from the assignee terminal, may check that the identifier of the newest block received from the assignee terminal is an identifier of a block within a predetermined number of blocks from the newest block, and verify the signature value based on the block information of the block corresponding to the identifier of the received newest block, the signature value, and the address of the assignee.

A second feature of the present invention relates to a content contract method used for a content contract system, the content contract system being for distributing a right to content data. The content contract system includes a right holder terminal used by a right holder having the right to the content data, an assignee terminal used by an assignee to which the right is assigned from the right holder, a control terminal verifying a transaction transmitted by the right holder terminal or the assignee terminal, and a content accumulation server connecting to the right holder terminal. The right holder terminal, the assignee terminal, and the control terminal are connected via a P2P network, and a distributed ledger is stored, the distributed ledger including a transaction that is set with a smart contract program to distribute the right, and being synchronized among the right holder terminal, the assignee terminal, and the control terminal. The content contract method according to the second feature of the present invention includes, at the right holder terminal, transmitting the content data to the content accumulation server, and acquiring match information for the content data from the content accumulation server, at the right holder terminal, transmitting a token issuance transaction that issues token data including the match information and a type of a right to be distributed, at the control terminal, in making the token issuance transaction be included in the distributed ledger, generating token data that includes the match information and the type of the right, is set with an address of the right holder as owner information, and is identified by a token identifier, and registering the token data corresponding to the token identifier in the distributed ledger, at the right holder terminal, acquiring the token identifier for identifying the token data, at the right holder terminal, transmitting an application collection transaction that including the token identifier and collects an assignee of the right, at the control terminal, publishing the application collection transaction in making the application collection transaction be included in the distributed ledger, at the assignee terminal, transmitting an application transaction that applies for the application collection transaction, and at the control terminal, in making the application transaction be included in the distributed ledger, changing the owner information of the token data corresponding to the token identifier of the distributed ledger from the address of the right holder to an address of the assignee.

A third feature of the present invention relates to a right holder terminal used for a content contract system, the content contract system being for distributing a right to content data. The content contract system includes the right holder terminal used by a right holder having the right to the content data, an assignee terminal used by an assignee to which the right is assigned from the right holder, a control terminal verifying a transaction transmitted by the right holder terminal or the assignee terminal, and a content accumulation server connecting to the right holder terminal. The right holder terminal, the assignee terminal, and the control terminal are connected via a P2P network, and a distributed ledger is stored, the distributed ledger including a transaction that is set with a smart contract program to distribute the right, and being synchronized among the right holder terminal, the assignee terminal, and the control terminal. The right holder terminal according to the third feature of the present invention includes a match information acquisition unit transmitting the content data to the content accumulation server, and acquiring match information for the content data from the content accumulation server, a token issuance transaction transmission unit transmitting a token issuance transaction that issues token data including the match information and a type of a right to be distributed, and acquiring a token identifier for identifying the token data, and an application collection transaction transmission unit transmitting an application collection transaction that includes the token identifier and collects an assignee of the right.

A fourth feature of the present invention relates to an assignee terminal used for a content contract system, the content contract system being for distributing a right to content data. The content contract system includes a right holder terminal used by a right holder having the right to the content data, the assignee terminal used by an assignee to which the right is assigned from the right holder, a control terminal verifying a transaction transmitted by the right holder terminal or the assignee terminal, and a content accumulation server connecting to the right holder terminal. The right holder terminal, the assignee terminal, and the control terminal are connected via a P2P network, and a distributed ledger is stored, the distributed ledger including a transaction that is set with a smart contract program to distribute the right, and being synchronized among the right holder terminal, the assignee terminal, and the control terminal. The assignee terminal according to the fourth feature of the invention includes an application transaction transmission unit transmitting an application transaction that applies for an application collection transaction, the application collection transaction being transmitted by the right holder terminal and including a token identifier for identifying token data that includes match information for the content data and a type of a right to be distributed.

A fifth feature of the present invention relates to a control terminal used for a content contract system, the content contract system being for distributing a right to content data. The content contract system includes a right holder terminal used by a right holder having the right to the content data, an assignee terminal used by an assignee to which the right is assigned from the right holder, the control terminal verifying a transaction transmitted by the right holder terminal or the assignee terminal, and a content accumulation server connecting to the right holder terminal. The right holder terminal, the assignee terminal, and the control terminal are connected via a P2P network, a distributed ledger is stored, the distributed ledger including a transaction that is set with a smart contract program to distribute the right, and being synchronized among the right holder terminal, the assignee terminal, and the control terminal, and the control terminal according to the fifth feature of the present invention includes a transaction processing unit processing the transactions, in which the transaction processing unit includes a token issuance unit making a token issuance transaction be included in the distributed ledger, the token issuance transaction issuing token data including match information for the content data and a type of a right to be distributed, generating the token data that includes the match information and the type of the right, is set with an address of the right holder as owner information, and is identified by a token identifier, and registering the token data corresponding to the token identifier in the distributed ledger, an application collection unit making an application collection transaction be included in the distributed ledger, the application collection transaction being transmitted by the right holder terminal and including a token identifier for identifying token data that includes the match information for the content data and the type of the right to be distributed, and an application unit making the application transaction that applies for the application collection transaction be included in the distributed ledger, and changing the owner information of the token data corresponding to the token identifier of the distributed ledger from the address of the right holder to an address of the assignee.

A sixth feature of the present invention relates to a content accumulation server used for a content contract system, the content contract system being for distributing a right to content data. The content contract system includes a right holder terminal used by a right holder having the right to the content data, an assignee terminal used by an assignee to which the right is assigned from the right holder, a control terminal verifying a transaction transmitted by the right holder terminal or the assignee terminal, and the content accumulation server connecting to the right holder terminal. The right holder terminal, the assignee terminal, and the control terminal are connected via a P2P network, a distributed ledger is stored, the distributed ledger including a transaction that is set with a smart contract program to distribute the right, and being synchronized among the right holder terminal, the assignee terminal, and the control terminal, and token data associated with a token identifier is registered in the distributed ledger, the token data including match information of the content data and a type of a right to be distributed, and being set with an address of the assignee as owner information. The content accumulation server according to the sixth feature of the present invention includes a content providing unit, in response to reception of the token identifier from the assignee terminal, referencing the owner information corresponding to the token identifier of the distributed ledger, and in a case that the owner information is set with the address of the assignee, providing the content data to the assignee terminal.

A seventh feature of the present invention relates to a right holder program for causing a computer to function as the right holder terminal described in the third feature of the present invention.

An eighth feature of the present invention relates to an assignee program for causing a computer to function as the assignee terminal described in the fourth feature of the present invention.

A ninth feature of the present invention relates to a control program for causing a computer to function as the control terminal described in the fifth feature of the present invention.

A tenth feature of the present invention relates to a content accumulation program for causing a computer to function as the content accumulation server described in the sixth feature of the present invention.

Effects of the Invention

According to the present invention, it is possible to provide a content contract system, a content contract method, and a control terminal that distribute a right for content data using a distributed ledger.

DESCRIPTION OF EMBODIMENTS

Next, an embodiment of the present invention will be described with reference to the drawings. In the following description regarding the drawings, the same or similar reference signs will be denoted to the same or similar components.

Content Contract System

Figure 1:
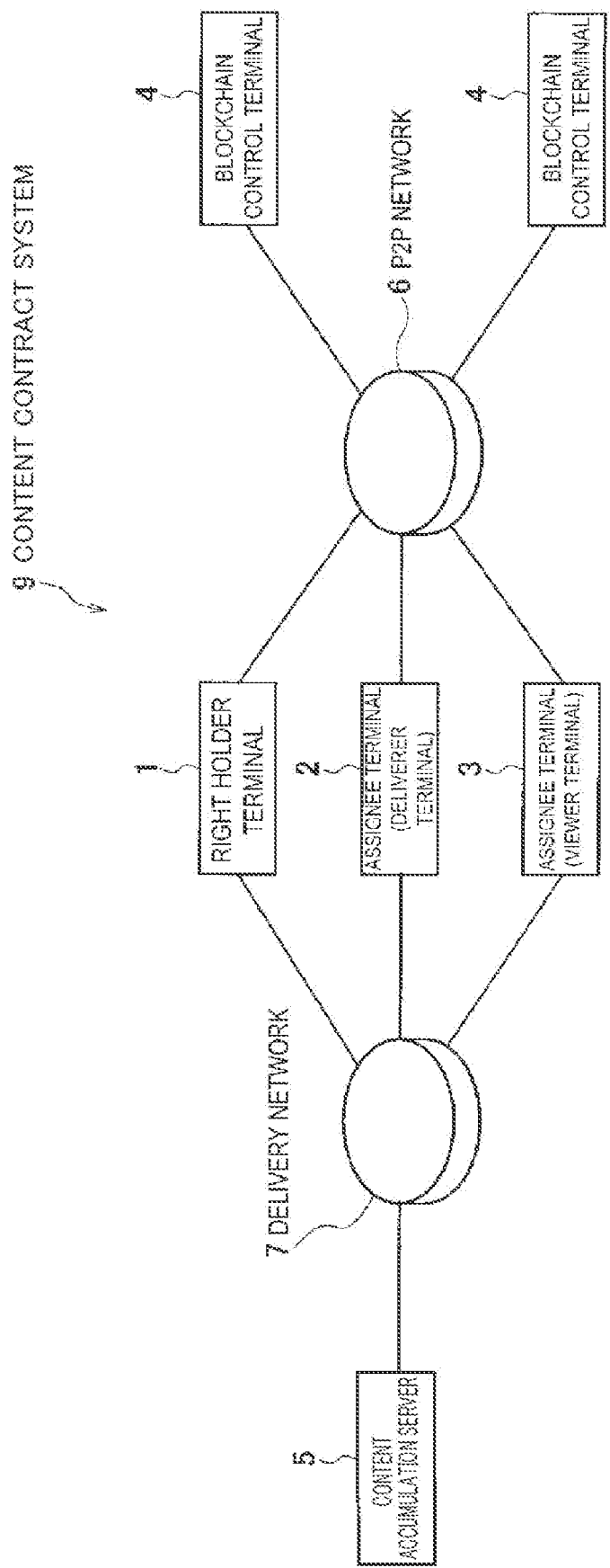
FIG. 1 is a diagram illustrating a system configuration of a content contract system according to an embodiment of the present invention.

Referring to FIG. 1, a content contract system 9 according to the embodiment of the present invention will be described. The content contract system distributes a right to content data C. The content contract system 9 performs right processing between a right holder of the content data C and a party to which a predetermined right is assigned or licensed from the right holder, via a blockchain B that is a type of a non-center-distributed distributed ledger.

Figure 4:
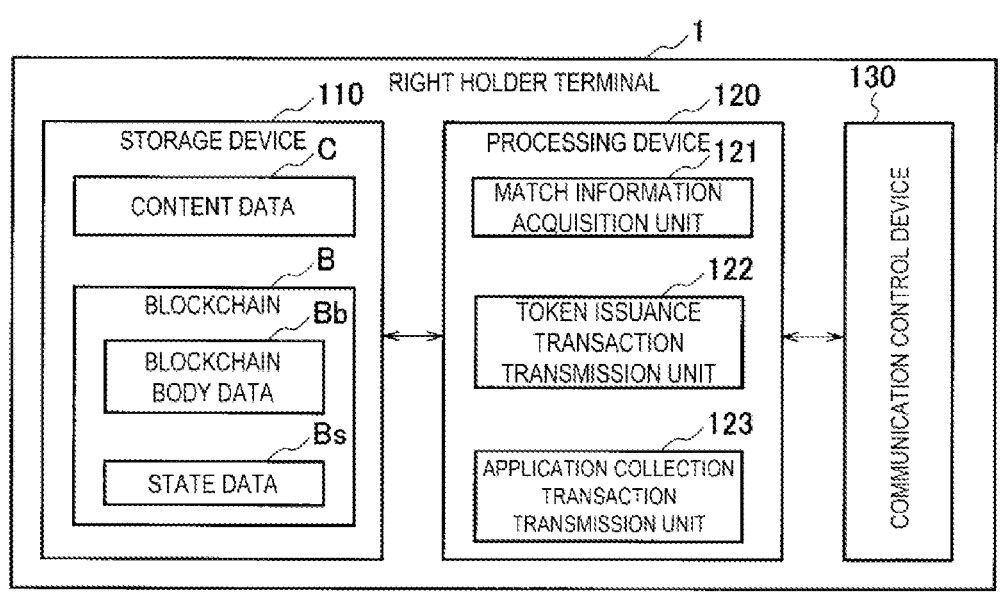
FIG. 4 is a diagram illustrating a hardware configuration and functional blocks of a right holder terminal according to the embodiment of the present invention.

In the embodiment of the present invention, the blockchain B performs the right processing on the content data C in accordance with the Ethereum. As illustrated in FIG. 4 and the like, the blockchain B includes a blockchain body data Bb and state data Bs. The blockchain body data Bb is formed by coupling a plurality of blocks in a chain. Each block may include a plurality of transactions, and the transaction may be set with a smart contract program. The state data Bs is updated in accordance with the execution of the smart contract program.

The right processing in the embodiment of the present invention is described regarding a case of being performed by the smart contract of the blockchain B in accordance with the Ethereum, but the right processing is not limited thereto. For example, the smart contract blockchain by the Hyperledger Fabric may be adopted.

The content contract system 9 includes a right holder terminal 1, assignee terminals 2 and 3, a content accumulation server 5, and a blockchain control terminal (control terminal) 4.

The right holder terminal 1, the assignee terminals 2 and 3, and the blockchain control terminal 4 are connected to be able to communicate with any terminal over a P2P network 6. The right holder terminal 1, the assignee terminals 2 and 3, and the blockchain control terminal 4 cooperate with each other to build the blockchain B and synchronize.

The right holder terminal 1 is a terminal used by a right holder having the right to the content data C to be distributed. The right holder may, for example, be a creator of the content data C. or a person whom a right regarding right distribution is delegated from the creator.

Each of the assignee terminals 2 and 3 is a terminal used by an assignee whom a right is assigned from the right holder. The assignee can utilize the content data C depending on the assigned right. In the example illustrated in FIG. 1, the assignee terminal 2 is a deliverer terminal used by a deliverer whom a delivery right is assigned from the right holder. The assignee terminal 3 is a viewer terminal used by a viewer who a licensee right of a predetermined right is assigned from the right holder to and views the content. Note that, in the embodiment of the present invention, a case is described in that the license right is assigned to the deliverer from the right holder, and the deliverer establishes the license right to the viewer (licensee).

The blockchain control terminal 4 is a terminal verifying a transaction transmitted by the right holder terminal 1 or the assignee terminal 2. The blockchain control terminal 4 shares the blockchain B with the right holder terminal 1 and the assignee terminals 2 and 3. In FIG. 1, the content contract system 9 includes two blockchain control terminals 4, but the number of blockchain control terminals 4 is not limited.

In the embodiment of the present invention, the blockchain control terminal 4 verifies the transactions issued by the right holder terminal 1, the assignee terminal 2, or the like, bundles the verified transactions into a block, and couples the block to the end of the blockchain body data Bb.

The transactions issued by the right holder terminal 1, the assignee terminal 2 or 3, and the like for the blockchain B are broadcast to the P2P network 6. The broadcast transactions are verified by the blockchain control terminal 4 to form a block including a plurality of transactions. More specifically, the blockchain control terminal 4 references an electronic signature of a sender transmitted along with the transaction to verify whether the electronic signature corresponds to a public key of the sender. Furthermore, the blockchain control terminal 4 generates a new block from a plurality of transactions and a hash value of a block of the end of the blockchain body data Bb, and couples the new block to the end of the blockchain body data Bb. Each block of blockchain body data Bb includes a hash value of a preceding block, and each terminal participating in the P2P network 6 holds the blockchain B, and thus, a system resistant to tampering and having high transparency is constructed.

The blockchain body data Bb according to the embodiment of the present invention is a smart contract type. The transaction included in the block may be set with the program code of the smart contract to distribute the right. When the block for which the execution of the smart contract is defined are added to the blockchain B, the program code of the smart contract registered in advance with blockchain B is executed on the terminal that participates in the P2P network 6, with triggered by the transaction included in the block as input. As a result of the program code being executed, the state data Bs of the blockchain B is updated. The terminal that participates in the P2P network 6 includes a virtual machine called an Ethereum Virtual Machine (EVM) and executes the program code of the smart contract on the virtual machine. When the new block is coupled to the blockchain body data Bb in the blockchain control terminal 4, and the state data Bs is updated, the blockchains B in the right holder terminal 1 and the assignee terminals 2 and 3 are also synchronized.

The right holder terminal 1, the assignee terminals 2 and 3, and the content accumulation server 5 are communicably connected one another over a delivery network 7.

The content accumulation server 5 receives and stores the content data C to be distributed from the right holder terminal 1, and provides that content data to a person having a legitimate right in a range of the right.

Content Contract Method

Figure 2:
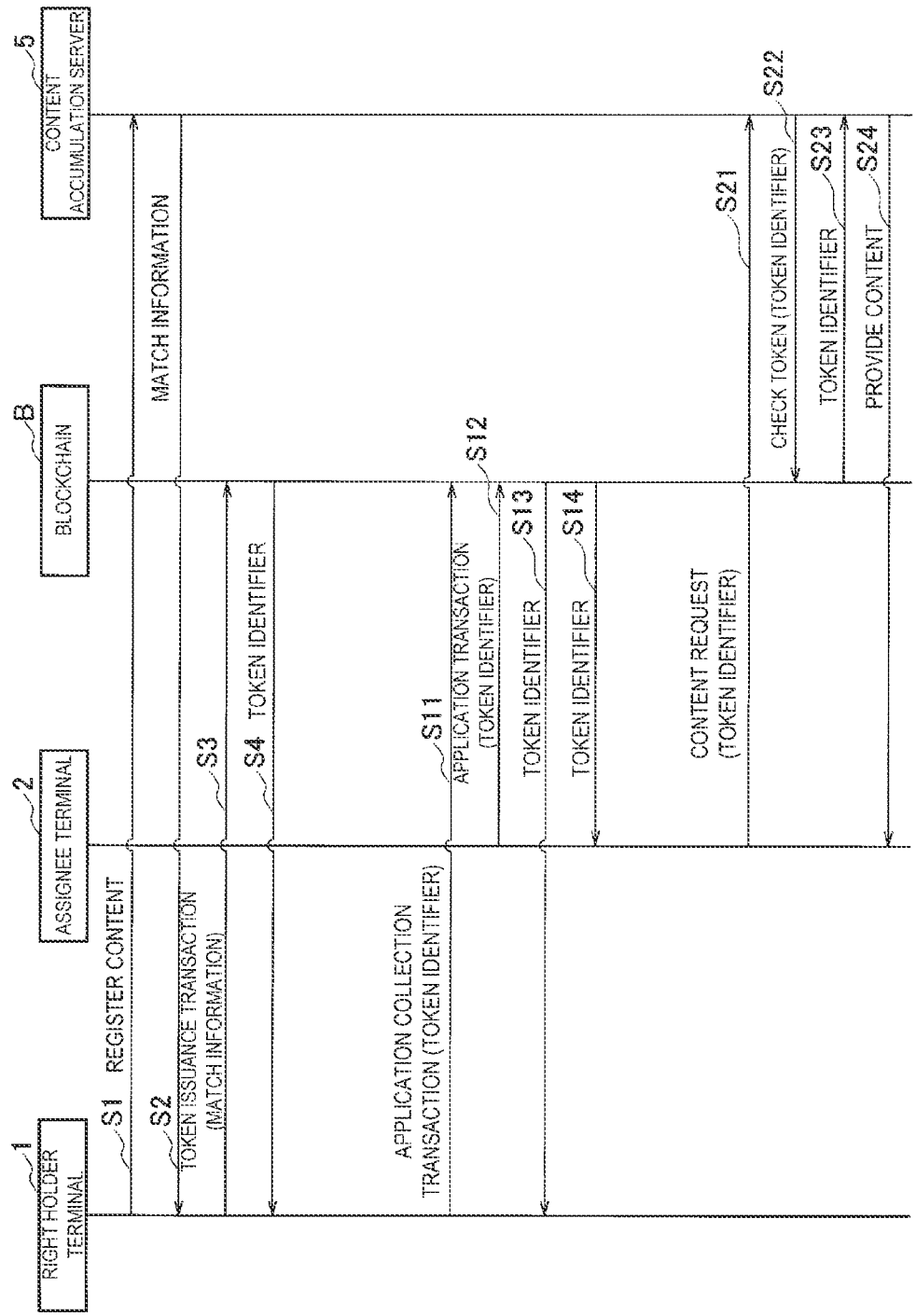
FIG. 2 is a sequence diagram illustrating an outline of a content contract method according to the embodiment of the present invention.

With reference to FIG. 2, an outline of a content contract method according to the embodiment of the present invention will be described. In the content contract method, the right to be distributed is tokenized into a Non-Fungible Token (NFT). The NFT allows an owner to perform the right processing such as management or assignment using the electronic signature in accordance with ERC721, which is a standard of the smart contract in the Ethereum, even without relying on a centralized third party. Note that the processing of the blockchain B in FIG. 2 is performed by the blockchain control terminal 4 that creates a block. Also, it is assumed that the program codes of the smart contract executed when each transaction of a token issuance transaction, an application collection transaction, and an application transaction is made to be included in the block are registered in advance with the blockchain B.

In step S1, the right holder terminal 1 transmits the content data C to be distributed to the content accumulation server 5, and the content accumulation server 5 stores the received content data C. The content accumulation server 5 creates match information for the received content data C, and transmits the match information to the right holder terminal 1 in step S2.

In step S3, the right holder terminal 1 transmits a token issuance transaction to the P2P network 6, the token issuance transaction requesting issue of a token to identify the right to be distributed in order to distribute the right to the content data C. The token issuance transaction includes the match information received in step S2 and a type of right to be distributed. The type of right of, for example, an ownership right, a delivery right, a viewing right, a secondary use right, or the like is appropriately set depending the type of the content data to be distributed, the right the right holder has, or the like. The token issuance transaction also includes match information and type of right to issue token data. The match information and the type of right included in the token issuance transaction are input values of the smart contract for issuing the token.

After the token issuance transaction is transmitted in step S3, the blockchain control terminal 4 verifies, for example, that the electronic signature transmitted along with the token issuance transaction corresponds to the public key of the right holder, validity of data of the token issuance transaction, and the like. The blockchain control terminal 4 executes the program code of the smart contract in accordance with the input value defined in the token issuance transaction, and generates the token data, which is a dataset involving logical control. The token data includes the NFT identifying the right to be distributed, and includes owner information of the token and the match information for the content data. The blockchain control terminal 4 further gives, to the token data, a token identifier that identifies the token data. The generated token data is associated with the token identifier and registered in the state data Bs of the blockchain B. Upon completion of the execution of the smart contract, the blockchain control terminal 4 bundles the token issuance transaction together with other transactions into a new block to couple the new block to the end of the blockchain body data Bb.

In step S4, the right holder terminal 1 acquires the token identifier from the blockchain B.

When the token identifier is given to the right desired to be distributed, the right holder terminal 1 can put the right into a distributable state. Specifically, in step S11, the right holder terminal 1 transmits the application collection transaction collecting an applicant that wants to be established with the right to be distributed. The application collection transaction includes a token identifier. The application collection transaction is verified by the blockchain control terminal 4, and thereafter, bundled into a block together with other transactions and coupled to the end of blockchain body data Bb. In accordance with the application collection transaction, an applicant of the right of content data C is collected. Here, as a qualification of the applicant, moving a certain amount of virtual currency to the right holder may be defined by the smart contract.

In step S12, the assignee terminal 2 transmits an application transaction to the application collection of the rights of the content data C. The application transaction includes a token identifier of an application target. The blockchain control terminal 4 verifies the application transaction, and thereafter, executes the smart contract defined in the application transaction. Here, in the case that the moving a certain amount of virtual currency to the right holder is defined as the qualification of the applicant by the smart contract, the blockchain control terminal 4 checks that the application transaction includes information indicating the movement of a specified amount of the virtual currency. In a case that the information indicating the movement of the specified amount of the virtual currency is included, the blockchain control terminal 4 references the state data Bs to update the token data having the token identifier of the application target included in the application transaction. In a case that the ownership right is transferred, the blockchain control terminal 4 changes the owner information from an address of the right holder to an address of the assignee. In a case that the ownership right is not transferred and the license right is set, the blockchain control terminal 4 sets the address of the assignee to the licensee information without changing the owner information. The blockchain control terminal 4 bundles the application transaction with other transactions into a new block to couple the new block to the end of the blockchain body data Bb.

Here, in accordance with the smart contract of blockchain B, a contract is established for the application collection transactions transmitted in step S11 and the application transactions transmitted in step S12. In step S13, the right holder terminal acquires the token identifier for which the contract is established. In step S14, the assignee terminal 2 acquires a token identifier for which the contract is established. This establishes the right to the content data C to the assignee to enable the assignee to exercise the right for content data set in the token.

In step S21, the assignee terminal 2 transmits a content request including the token identifier to the content accumulation server 5. In step S22, the content accumulation server 5 references the state data Bs of blockchain B, and, in step S23, acquires information of the token corresponding to the token identifier transmitted in step S21. In a case that the owner information of the token acquired from blockchain B corresponds to the assignee transmitting the token identifier in step S21, the content accumulation server 5 provides the content data to the assignee in step S24 in accordance with the right set in the token. Note that in the example illustrated in FIG. 2, the case is described that the content accumulation server 5 references the data of the blockchain B without issuing a transaction, but the content accumulation server 5 may issue a transaction in order to reference the data of the block.

Token Data

Figure 3:
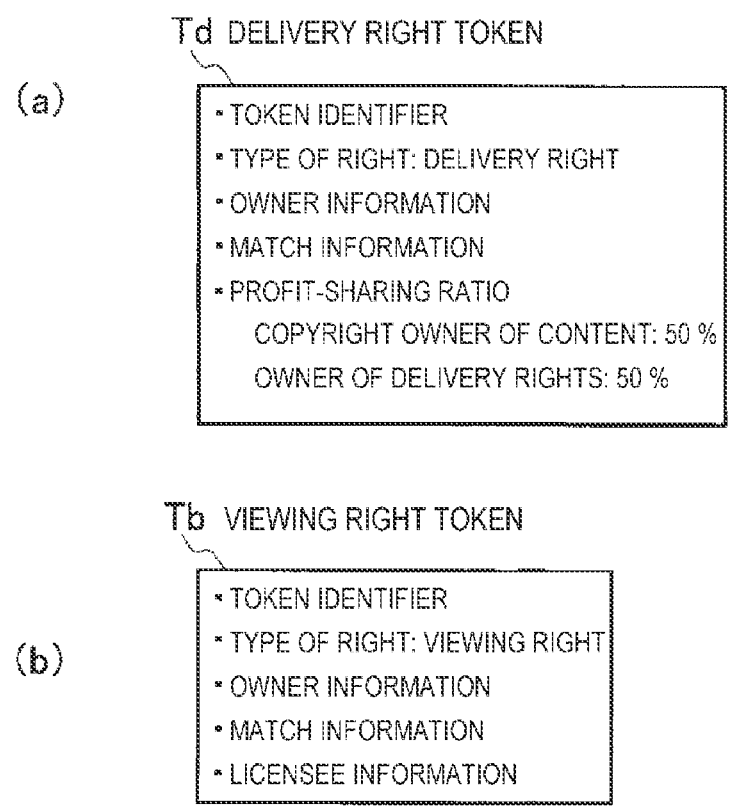
FIG. 3 is a diagram illustrating an example of token data according to the embodiment of the present invention.

With reference to FIG. 3, a token related to the right of content data will be described. The token data illustrated in FIG. 3(*a*) or 3(*b*) is issued for each content data piece and right to be distributed. Also, in a case that a plurality of assignees are established with the right, the token data is issued depending on the number of established rights. Also, in the example illustrated in FIG. 3, a case that the token identifier and the type of right are included in each token is described, without limitation. Each token may be identified by a token identifier and a type of right.

As illustrated in FIG. 3(*a*), a delivery right token Td for a delivery right of content data includes a token identifier as a key, a type of right of the right to be distributed, owner information to identify an owner, and match information calculated in the content accumulation server 5. The type of right is set with the delivery right. The owner information is an address of an owner of the right to be distributed, the address being uniquely identifiable by the electronic signature managed in the blockchain B. The match information identifies the content data C to be distributed. The delivery right token Td may further include profit-sharing ratio information in a case that a compensation obtained by use of the content data C is shared. The profit-sharing ratio information includes an identifier of a sharer by which the profit is shared and a profit-sharing ratio of each sharer. In the example illustrated in FIG. 3(*a*), the profit is shared between a copyright owner of the content and an owner of the delivery right on a 50-50 basis. The profit sharing associated with the content distribution is performed in accordance with the smart contract of the blockchain B.

As illustrated in FIG. 3(*b*), a viewing right token Tb for a content data viewing right includes a token identifier as a key, a type of right of the right to be distributed, owner information to identify an owner such as an address of the owner of the viewing right, and match information calculated in the content accumulation server 5. The type of right is set with the viewing right. The owner of the viewing right may not assign viewing right to a third party, but may license only a partial right of the viewing right to the licensee in a case where the owner desires to show content data to a viewer, or the like. In such a case, the viewing right token Tb further includes licensee information, and the licensee information is set with an address of the viewer (licensee) to whom the viewing right is licensed so that the viewer can view the content data.

Note that the address set in the token illustrated in FIGS. 3(*a*) and 3(*b*) and the like is an address of each person used in the blockchain B, or an address corresponding to the address of each person used in the blockchain B. In FIG. 3, the case that the delivery right and the viewing right are distributed is described, but the token data of the NFT is similarly set for other copyright rights, such as the secondary use right. Additionally, required items may be set as appropriate in accordance with the right to be distributed.

Right Holder Terminal

With reference to FIG. 4, the right holder terminal 1 according to the embodiment of the present invention will be described. The right holder terminal 1 is a typical computer including a storage device 110, a processing device 120, and a communication control device 130. The functions illustrated in FIG. 4 are implemented by the typical computer executing a right holder program. Note that a case is described that the right holder terminal 1 does not perform coupling of the block of the blockchain B and the like, but the right holder terminal 1 may perform processing for coupling the block.

The storage device 110 is a Read Only Memory (ROM), a Random Access Memory (RAM), a hard disk, or the like and stores various kinds of data such as input data, output data, and intermediate data for the processing device 120 executing processing. The processing device 120 is a Central Processing Unit (CPU) and executes processing of the right holder terminal 1 by reading and writing data stored in the storage device 110 and inputting and outputting data to and from the communication control device 130. The communication control device 130 is an interface for the right holder terminal 1 to communicably connect to the assignee terminals 2 and 3, the content accumulation server 5, the blockchain control terminal 4, and the like.

The storage device 110 stores the right holder program and stores the content data C and the blockchain B. The content data C is video data, electronic book data, music data, or data of digital content to be distributed.

The blockchain B is synchronized among the right holder terminal 1, the assignee terminals 2 and 3, and the blockchain control terminal 4. The blockchain B includes the blockchain body data Bb and the state data Bs.

The blockchain body data Bb includes a plurality of blocks coupled, each block including a plurality of transactions transmitted from a terminal belonging to the P2P network 6. The transaction may be set with a program called a smart contract program. The transactions set with the smart contract program is registered with the blockchain B and synchronized among the terminals belonging to the P2P network 6.

When the blockchain control terminal 4 makes a transaction that is set with the input value of the smart contract program be included in the blockchain body data Bb, the blockchain control terminal 4 executes the smart contract program included in the blockchain B in accordance with the input value.

The result of the execution of the smart contract program is stored as a state of the state data Bs. The state of the state data Bs is updated with the execution of the smart contract program. In the embodiment of the present invention, the token data is registered as a state of the state data Bs with the blockchain B.

The processing device 120 includes a match information acquisition unit 121, a token issuance transaction transmission unit 122, and an application collection transaction transmission unit 123.

The match information acquisition unit 121 transmits the content data C to the content accumulation server 5, and acquires the match information for the content data C from the content accumulation server 5. The match information is used to identify the content data C.

The token issuance transaction transmission unit 122 transmits the token issuance transaction that issues the token data including the match information and the type of right to be distributed, and acquires the token identifier that identifies the token data. The token issuance transaction transmission unit 122 makes the match information for the content data C to be distributed and the type of right to be distributed be included in the token issuer transaction to enable the execution of the smart contract program for issuing the token. The token issuance transaction transmission unit 122 broadcasts the token issuance transaction to the P2P network 6 to cause the blockchain control terminal 4 to generate the token data. Furthermore, the token issuance transaction transmission unit 122 acquires the token identifier given by the blockchain control terminal 4. The token identifier is used to identify the content data C and the type of right to be distributed.

The application collection transaction transmission unit 123 transmits the application collection transaction that includes the token identifier and collects the assignee of the right. Once the application collection transaction is registered with the blockchain B, the content data C and the type of right specified by the token data are published as targets to be distributed. By referencing the state data Bs of the blockchain B, the content data C and the type of right to be distributed can be confirmed from the token identifier. In a case that a contract is established for the application collection transaction, the application collection transaction transmission unit 123 receives the token identifier of that transaction.

Assignee Terminal

Figure 5:
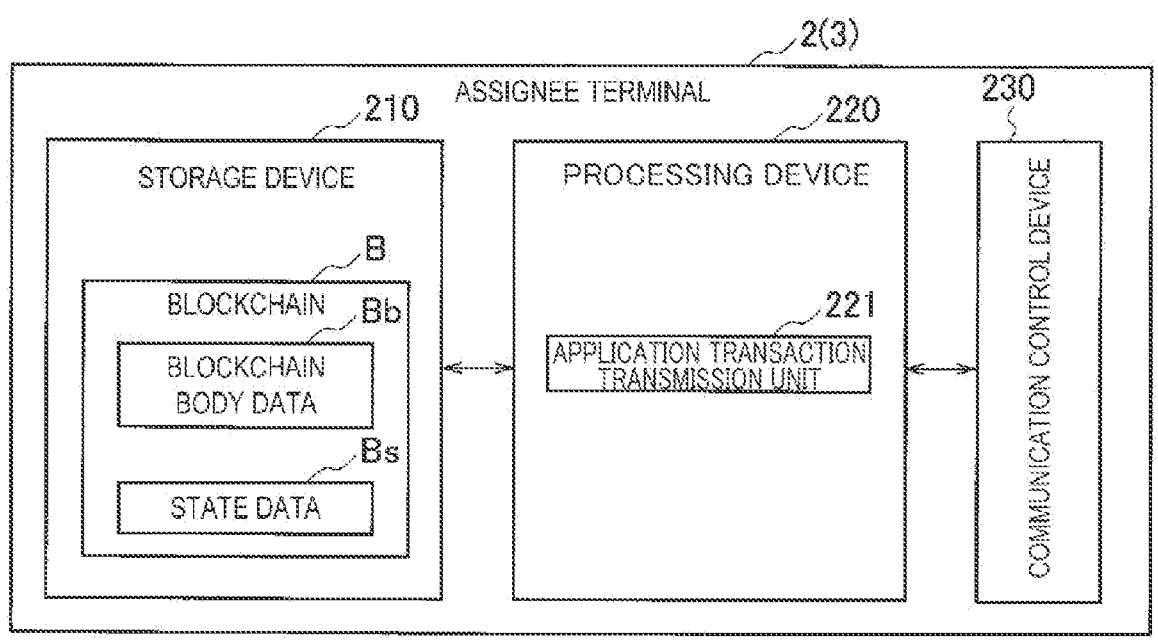
FIG. 5 is a diagram illustrating a hardware configuration and functional blocks of an assignee terminal according to the embodiment of the present invention.

With reference to FIG. 5, the assignee terminal 2 according to the embodiment of the present invention will be described. In an example illustrated in FIG. 5, a case is described that the assignee terminal 2 is used by a deliverer to which a delivery right is assigned from a right holder, but the same applies to a terminal (assignee terminal 3) that is used by a viewer to which a viewing right is licensed (licensee). The assignee terminal 2 is a typical computer including a storage device 210, a processing device 220, and a communication control device 230. The functions illustrated in FIG. 5 are implemented by the typical computer executing an assignee program. Note that a case is described that the assignee terminal 2 does not perform coupling of the block of the blockchain B and the like, but the assignee terminal 2 may perform processing for coupling the block.

The storage device 210 is a Read Only Memory (ROM), a Random Access Memory (RAM), a hard disk, or the like and stores various kinds of data such as input data, output data, and intermediate data for the processing device 120 executing processing. The processing device 220 is a Central Processing Unit (CPU) and executes processing of the assignee terminal 2 by reading and writing data stored in the storage device 210 and inputting and outputting data to and from the communication control device 230. The communication control device 230 is an interface for the assignee terminal 2 to communicably connect to the right holder terminal 1, the content accumulation server 5, the blockchain control terminal 4, and the like.

The storage device 210 stores the assignee program and stores the blockchain B.

The processing device 220 includes an application transaction transmission unit 221.

The application transaction transmission unit 221 transmits an application transaction to apply for the application collection transaction. The application transaction includes the token identifier included in the application collection transaction. The token identifier is the input value of the program of the smart contract that changes the owner of the token data. In a case that a contract is established for the application transaction, the application transaction transmission unit 221 receives the token identifier of that transaction.

Blockchain Control Terminal

Figure 6:
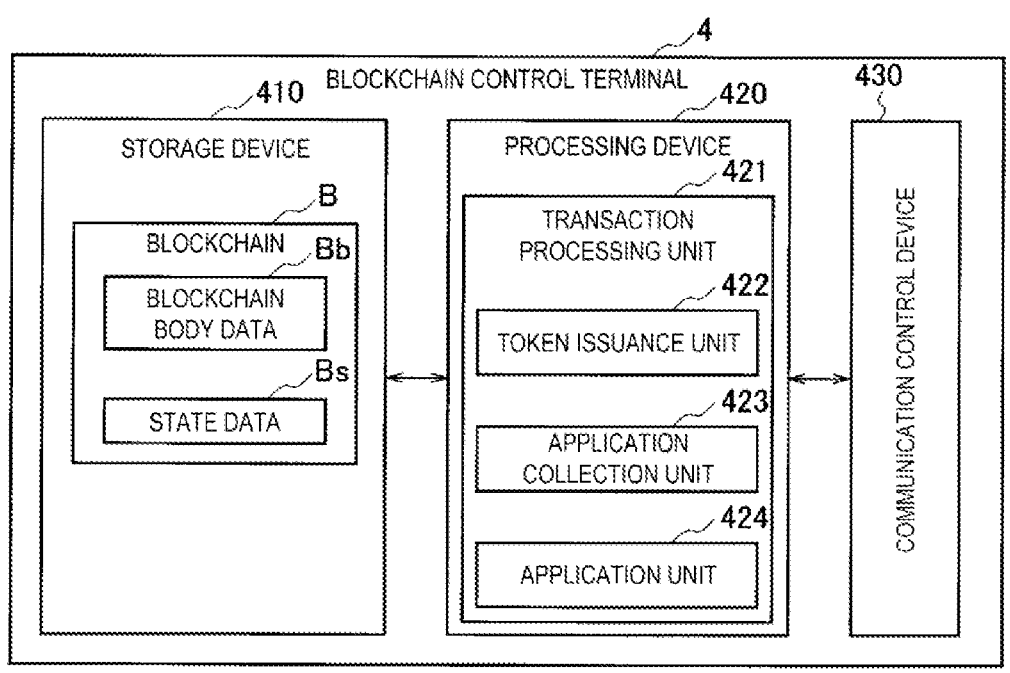
FIG. 6 is a diagram illustrating a hardware configuration and functional blocks of a blockchain control terminal according to the embodiment of the present invention.

With reference to FIG. 6, the blockchain control terminal 4 according to the embodiment of the present invention will be described. The blockchain control terminal 4 is a typical computer including a storage device 410, a processing device 420, and a communication control device 430. The functions illustrated in FIG. 6 are implemented by the typical computer executing a blockchain control program.

The storage device 410 is a Read Only Memory (ROM), a Random Access Memory (RAM), a hard disk, or the like and stores various kinds of data such as input data, output data, and intermediate data for the processing device 420 executing processing. The processing device 420 is a Central Processing Unit (CPU) and executes processing of the blockchain control terminal 4 by reading and writing data stored in the storage device 410 and inputting and outputting data to and from the communication control device 430. The communication control device 430 is an interface for the blockchain control terminal 4 to communicably connect to the right holder terminal 1, the assignee terminals 2 and 3, and the like.

The storage device 410 stores the blockchain control program and stores the blockchain B.

The processing device 420 verifies the transaction and makes the verified transaction be included in a new block. The processing device 420 further includes a transaction processing unit 421.

The transaction processing unit 421 references an electronic signature of a sender transmitted along with the transaction to verify that the electronic signature corresponds to a public key of the sender. The transaction processing unit 421 generates a new block from a plurality of verified transactions and a hash value of a block of the end of the blockchain body data Bb, and couples the new block to the end of the blockchain body data Bb.

At this time, when the transaction processing unit 421 makes the transaction be included in the new block, the transaction processing unit 421 executes the program code of the smart contract in accordance with the data set in a data region of the transaction.

The transaction processing unit 421 includes a token issuance unit 422, an application collection unit 423, and an application unit 424.

The token issuance unit 422 verifies the token issuance transaction transmitted from the right holder terminal 1, makes the verified transaction be included in the blockchain B, and generates token data that includes the match information and the type of right, is set with an address of the right holder as the owner information, and is identified by the token identifier. The token issuance unit 422 registers the generated token data corresponding to the token identifier with the state data Bs of the blockchain B.

The application collection unit 423 verifies the application collection transaction transmitted from the right holder terminal 1 and makes the verified transaction be included in the blockchain B. The blockchain B being synchronized allows the terminals belonging to the P2P network 6 to share that the content data and the right specified by the token data that is identified by the token identifier included in the application collection transaction are set as targets to be distributed.

The application unit 424 verifies the application transaction transmitted from the assignee terminal 2, makes the verified transaction be included in the blockchain B, and changes the owner information of the token data corresponding to the token identifier of the state data Bs of the blockchain B from the address of the right holder to the address of the assignee. By doing so, the owner being changed from the right holder to the assignee for the content data C and the right to be distributed is registered with the state data Bs of the blockchain B, and is shared by the terminals belonging to the P2P network 6.

Note that in the embodiment of the present invention, the token issuance unit 422, the application collection unit 423, and the application unit 424 are described as being implemented by one blockchain control terminal 4. However, the configuration is not limited thereto, and the token issuance unit 422, the application collection unit 423, and the application unit 424 may be separately implemented by different blockchain control terminals 4. Specifically, the token issuance unit 422 is carried out by a terminal that couples the token issuance transaction to the blockchain body data Bb. The application collection unit 423 is carried out by a terminal that couples the application collection transaction to the blockchain body data Bb. The application unit 424 is carried out by a terminal that couples the application transaction to the blockchain body data Bb.

Content Accumulation Server

Figure 7:
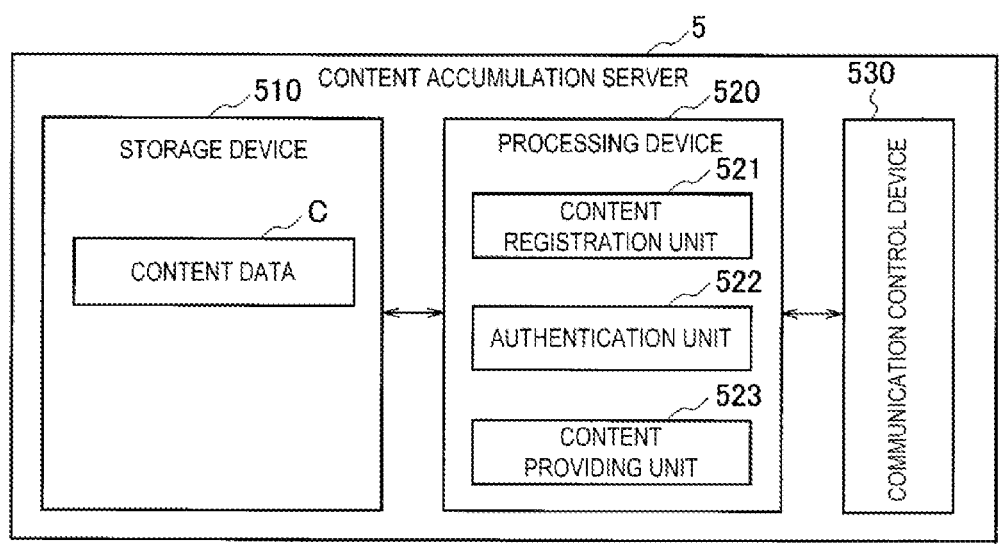
FIG. 7 is a diagram illustrating a hardware configuration and functional blocks of a content accumulation server according to the embodiment of the present invention.

With reference to FIG. 7, an outline of the content accumulation server 5 according to the embodiment of the present invention will be described. The content accumulation server 5 is a typical computer that includes a storage device 510, a processing device 520, and a communication control device 530. The functions illustrated in FIG. 7 are implemented by the typical computer executing a content accumulation program.

The storage device 510 is a Read Only Memory (ROM), a Random Access Memory (RAM), a hard disk, or the like and stores various kinds of data such as input data, output data, and intermediate data for the processing device 520 executing processing. The processing device 520 is a Central Processing Unit (CPU) and executes processing of the assignee terminal 2 by reading and writing data stored in the storage device 510 and inputting and outputting data to and from the communication control device 530. The communication control device 530 is an interface for the content accumulation server 5 to communicably connect to the right holder terminal 1, the assignee terminals 22 and 3, and the like.

The storage device 510 stores the content data C. The content data C is data transmitted from the right holder terminal 1 and is used by the assignee terminal 2. Note that the content data C may be stored in a storage device built into the content accumulation server 5, or may be stored in an external storage device connected via an input/output interface or the like.

The processing device 520 includes a content registration unit 521, an authentication unit 522, and a content providing unit 523.

The content registration unit 521 receives the content data C and calculates the match information for the content data C. The content registration unit 521 transmits the calculated match information to the right holder terminal 1. The content registration unit 521 holds the content data C and the calculated match information in association with each other.

The match information is a hash value of the content data C. This allows the match information to uniquely identify the content data C.

The content registration unit 521 may calculate a value of features of the content data C as the match information. The match information is calculated, for example, from the feature value of the content data C, and is a fingerprint or hash value thereof for probabilistically identifying an entity. In a case that the content data C is video data or image data, the content registration unit 521 may generate the match information based on the feature value of the image. By doing so, even in a case that the content data C is assigned to a third party without the identity of the content data C in a state where the coding scheme of the content data C is changed or the resolution thereof is changed, it is possible to approve that the content assigned to the third party is probabilistically identical.

The authentication unit 522 authenticates that the assignee requesting delivery is set in the token data to properly deliver to the owner (or the licensee) of the token data. A method in which the authentication unit 522 authenticates the assignee includes a challenge response scheme and a time stamp method using information of the blockchain B.

In the challenge response scheme, the authentication unit 522 transmits a random number to the assignee terminal 2 in response to reception of the authentication request of the assignee from the assignee terminal 2. The authentication unit 522 receives, from the assignee terminal 2, a signature value given the random number signed with a private key corresponding to the address of the assignee, and verifies the signature value based on the random number, the signature value, and the address of the assignee. Here, the assignee electronically signs the random number received from the content accumulation server 5 using a method capable of verifying the electronic signature and capable of restoring the public key of the assignee, such as the Elliptic Curve Digital Signature Algorithm (ECDSA). The assignee has a public key and a private key in advance in the ECDSA scheme, and the address identifying the assignee is calculated from the public key.

In the time stamp scheme using the information of the blockchain B, the authentication unit 522 receives, from the assignee terminal 2, a signature value given block information of the newest block signed with a private key corresponding to the address of the assignee. The authentication unit 522 verifies the signature value based on the block information of each of the predetermined number of most recent blocks, the signature value, and the address of the assignee. After the assignee terminal 2 acquires the newest block from the blockchain body data Bb of the blockchain B until the authentication unit of the content accumulation server 5 references the blockchain B, other blocks may be added. Thus, the authentication unit 522 verifies the block information of the predetermined number of most recent blocks, for example, 10 blocks. In a case that the block information of the predetermined number of blocks may not be verified, such as in a case that blocks exceeding 10 blocks are coupled after the assignee terminal 2 acquires the newest block information, the authentication unit 522 notifies that the authentication is not possible because freshness of the time stamp indicated by the assignee terminal 2 is spoiled, and the like. The authentication unit 522 again makes the assignee terminal 2 transmit a signature value given block information of the newest block signed with a private key corresponding to the address of the assignee.

Furthermore, in the time stamp scheme, in response to further receiving an identifier of the newest block from the assignee terminal 2, the authentication unit 522 checks that the identifier of the newest block received from the assignee terminal 2 is an identifier of a block within a predetermined number of blocks from the newest block. In a case that the identifier of the newest block transmitted from the assignee terminal 2 is not within the predetermined number from the newest block referenced by the authentication unit 522, the authentication unit 522 notifies that the authentication may not be made because the freshness of the time stamp indicated by the assignee terminal 2 is spoiled. In a case that the identifier of the newest block transmitted from the assignee terminal 2 is within the predetermined number from the newest block referenced by the authentication unit 522, the authentication unit 522 verifies the signature value based on the block information of the block corresponding to the identifier of the received newest block, the signature value, and the address of the assignee.

Note that the block information of the newest block used in the time stamp scheme is a block header, a root hash of the transaction, and the like. The block information is calculated based on a predefined calculation method between the content accumulation server 5 and the assignee terminal 2.

In response to reception of the token identifier from the assignee terminal 2, the content providing unit 523 references the owner information of the token data corresponding to the token identifier registered with the state data Bs of the blockchain B. In a case that the owner information of the token data is set with the address of the assignee, the content providing unit 523 provides the content data C to the assignee terminal 2. The content providing unit 523 can reference the state data Bs to confirm that the assignee terminal 2 is established with the predetermined right in the token data of the content data C to be provided, and provide the content data C.

The content providing unit 523 may provide the content data C with information corresponding to the address of the assignee set in the owner information of the token data. The content providing unit 523 adds information that can identify information of a provision source of the content data C by means of electronic transparency or the like upon providing the content. This makes it possible to identify the provision source that is an illegal distribution source even when the content data C is illegally distributed.

Tokens Issuance

Figure 8:
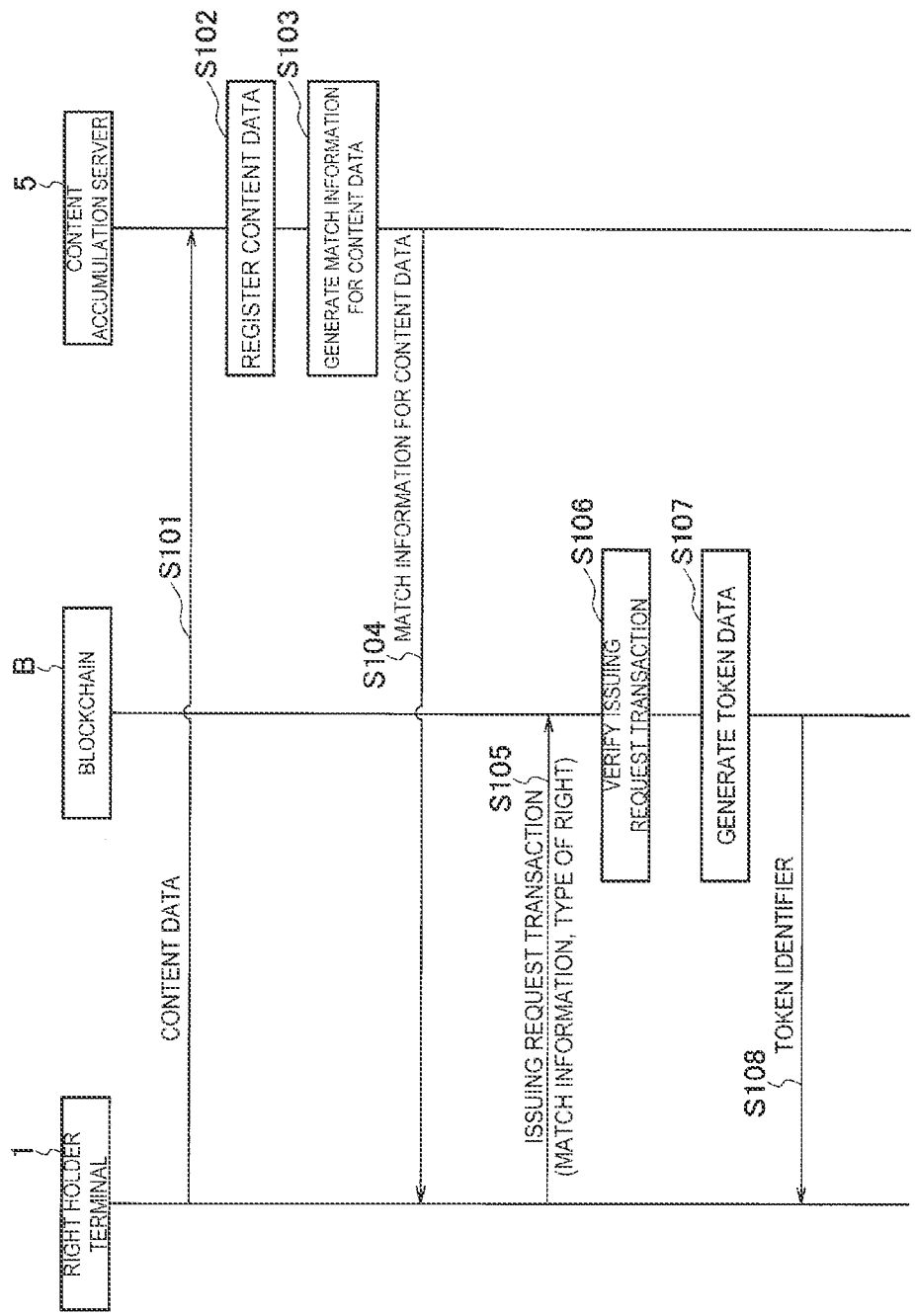
FIG. 8 is a sequence diagram illustrating a process for issuing a token in the embodiment of the present invention.

With reference to FIG. 8, processing for issuing a token for the content data C and the type of right to be distributed will be described.

In step S101, the right holder terminal 1 transmits the content data C to the content accumulation server 5.

In step S102, the content accumulation server 5 stores the content data C received in step S101 in the storage device. In step S103, the content accumulation server 5 creates the match information for the content data C. In step S104, the content accumulation server 5 transmits the match information for the content data C created in step S103 to the right holder terminal 1.

The right holder terminal 1, upon acquiring the match information for the content data C, broadcasts an issuing request transaction to the P2P network 6 in step S105. The issuing request transaction includes the match information for the content data C received in step S104 and the type of right to the content data C as information identifying the target to be distributed.

The issuing request transaction transmitted in step S105 is processed by the blockchain control terminal 4 belonging to the P2P network 6. In step S106, the blockchain control terminal 4 verifies a transmission source of the issuing request transaction, the data item, and the like. In a case that there is no problem with the issuing request transaction, in step S107, the blockchain control terminal 4 generates token data that includes the match information and the type of right received in step S105 and is set with the address of the right holder as the owner information. The blockchain control terminal 4 registers the token data generated in step S107 with the state data Bs of the blockchain B, bundles the issuing request transaction and other transactions to generate a new block, and couples the generated new block to the end of the blockchain body data Bb. The blockchain B to which the new block is coupled is synchronized at each terminal belonging to the P2P network 6.

In step S108, the right holder terminal 1 acquires the token identifier that identifies the token data generated in step S107 from the blockchain B. The right holder terminal 1, in response to reception of the token identifier, is enabled to identify the target to be distributed by the token identifier, and distribute the target.

Here, in a case that the right holder terminal 1 distributes one delivery right and 20 viewing rights, transactions to issue a total of 21 NFT for the respective rights are transmitted and 21 tokens are generated.

Transfer of Right

Figure 9:
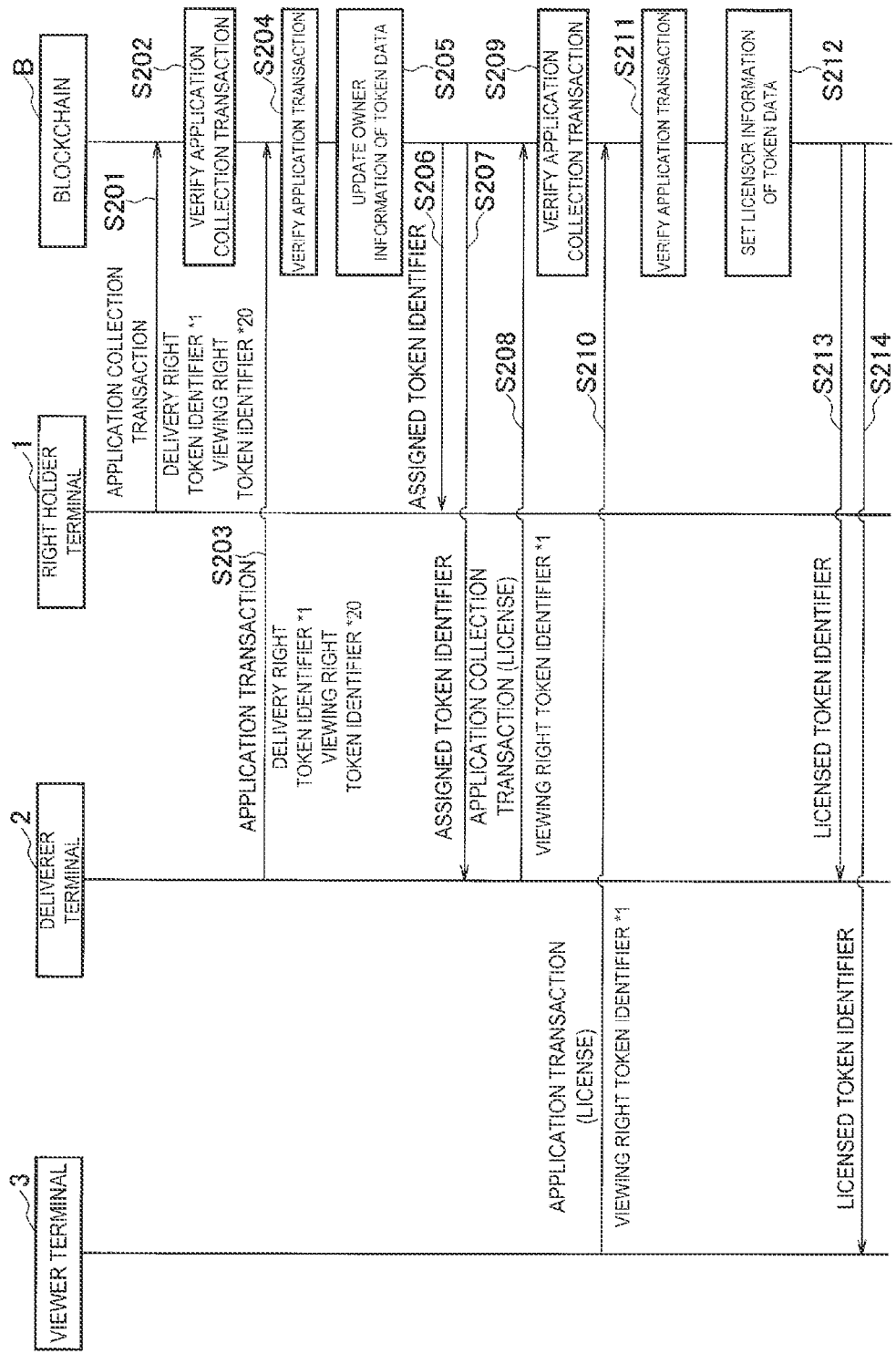
FIG. 9 is a sequence diagram illustrating a process for transferring a right in the embodiment of the present invention.

Referring to FIG. 9, processing will be described in which one delivery right and 20 viewing rights for the content data C are transferred from the right holder to the deliverer, and further one viewing right is licensed to the viewer from the deliverer. The processing illustrated in FIG. 8 produces a total of 21 NFT to distribute one delivery right and 20 viewing rights. In the example illustrated in FIG. 9, the case of transferring each of the rights defined in 21 NFT from the right holder to the deliverer described, but a parent token associated with 21 tokens may be generated for the distribution in units of the parent token.

First, the processing for transferring one delivery right and 20 viewing rights for the content data C from the right holder to the deliverer will be described. In step S201, the right holder terminal 1 transmits 21, to the P2P network 6, application collection transactions which are respectively set with one token identifier for the delivery right and 20 token identifiers for the viewing rights. The blockchain control terminal 4 belonging to the P2P network 6 verifies for each of 21 application collection transactions in step S202. The blockchain control terminal 4, after verifying the application collection transactions, bundles the application collection transactions and other transactions to generate a new block, and couples the generated new block to the end of the blockchain body data Bb. The blockchain B to which the new block is coupled is synchronized at each terminal belonging to the P2P network 6.

In step S203, the deliverer terminal 2 transmits, to the P2P network 6, 21 application transactions which are respectively set with one token identifier for the delivery right and 20 token identifiers for the viewing rights. The blockchain control terminal 4 belonging to the P2P network 6 verifies each of 21 application transactions in step S204. After the blockchain control terminal 4 verifies the application transaction, the blockchain control terminal 4, in step S205, changes the owner information for each of pieces of token data corresponding to one token identifier for the delivery right and 20 token identifiers for the viewing rights which are respectively set in the application transactions. The blockchain control terminal 4 changes the owner information for each piece of token data from the address of the right holder to the address of the deliverer in the state data Bs of the blockchain B. This allows the deliverer to be an owner of one token for the delivery right and the 20 tokens for the viewing rights. The blockchain control terminal 4 bundles the application transactions and other transactions to generate a new block, and couples the generated new block to the end of the blockchain body data Bb. The blockchain B to which the new block is coupled is synchronized at each terminal belonging to the P2P network 6.

In step S206, the right holder terminal 1 acquires, from the blockchain B, 21 token identifiers for which the ownership right is assigned. In step S207, the deliverer terminal 2 acquires, from the blockchain B, 21 token identifiers for which the ownership right is assigned.

Next, processing will be described in which one viewing right is licensed from the deliverer to the viewer. In step S208, the deliverer terminal 2 transmits one application collection transaction which is set with one token identifier for the viewing right to be licensed, to the P2P network 6. The blockchain control terminal 4 belonging to the P2P network 6 verifies the application collection transactions in step S209. The verified application collection transaction is included in the blockchain body data Bb, and the blockchain B including the application collection transaction is synchronized between the terminals belonging to the P2P network 6.

In step S210, the viewer terminal 3 transmits one application transaction which is set with one token identifier for the viewing right to be licensed, to the P2P network 6. The blockchain control terminal 4 belonging to the P2P network 6 verifies the application transaction in step S211. In step S212, the blockchain control terminal 4 changes the licensee information to the address of the viewer for token data corresponding to the token identifier for the viewing right set in the application transaction. This allows the viewer to whom the viewing right is licensed from the deliverer that is the owner of the viewing right to view the content data C. The application transaction is included in the blockchain body data Bb, and the blockchain B including the application transaction is synchronized between the terminals belonging to the P2P network 6.

In step S213, the deliverer terminal 2 acquires, from the blockchain B, the token identifier for which the viewing right is licensed. In step S214, the viewer terminal 3 acquires, from the blockchain B, the token identifier for which the viewing right is licensed.

In this manner, the transfer of the right with respect to the content data C is made autonomously in accordance with the smart contract on the blockchain B with no third parties involved. By doing so, the content contract system 9 according to the embodiments of the present invention can transfer the right regarding content data C with fairness and high transparency.

Note that the application transaction transmitted in step S203 may include a program to pay a compensation via other virtual currency systems, the compensation being required for acquiring one delivery right and 20 viewing rights upon applying for the application collection of these rights. In this case, the blockchain control terminal 4 attempts to pay the compensation according to the program for the smart contract configured in the application transaction, and in a case that the payment of the compensation is successful, the blockchain control terminal 4 rewrites the owner information. Furthermore, in a case that information of the profit sharing is set in each piece of token data, the blockchain control terminal 4 divides the compensation in accordance with the information. The profit sharing is made autonomously through the smart contract on the blockchain B with no third parties involved, and thus, is performed with fairness and high transparency.

Authentication in Content Accumulation Server

Figure 10:
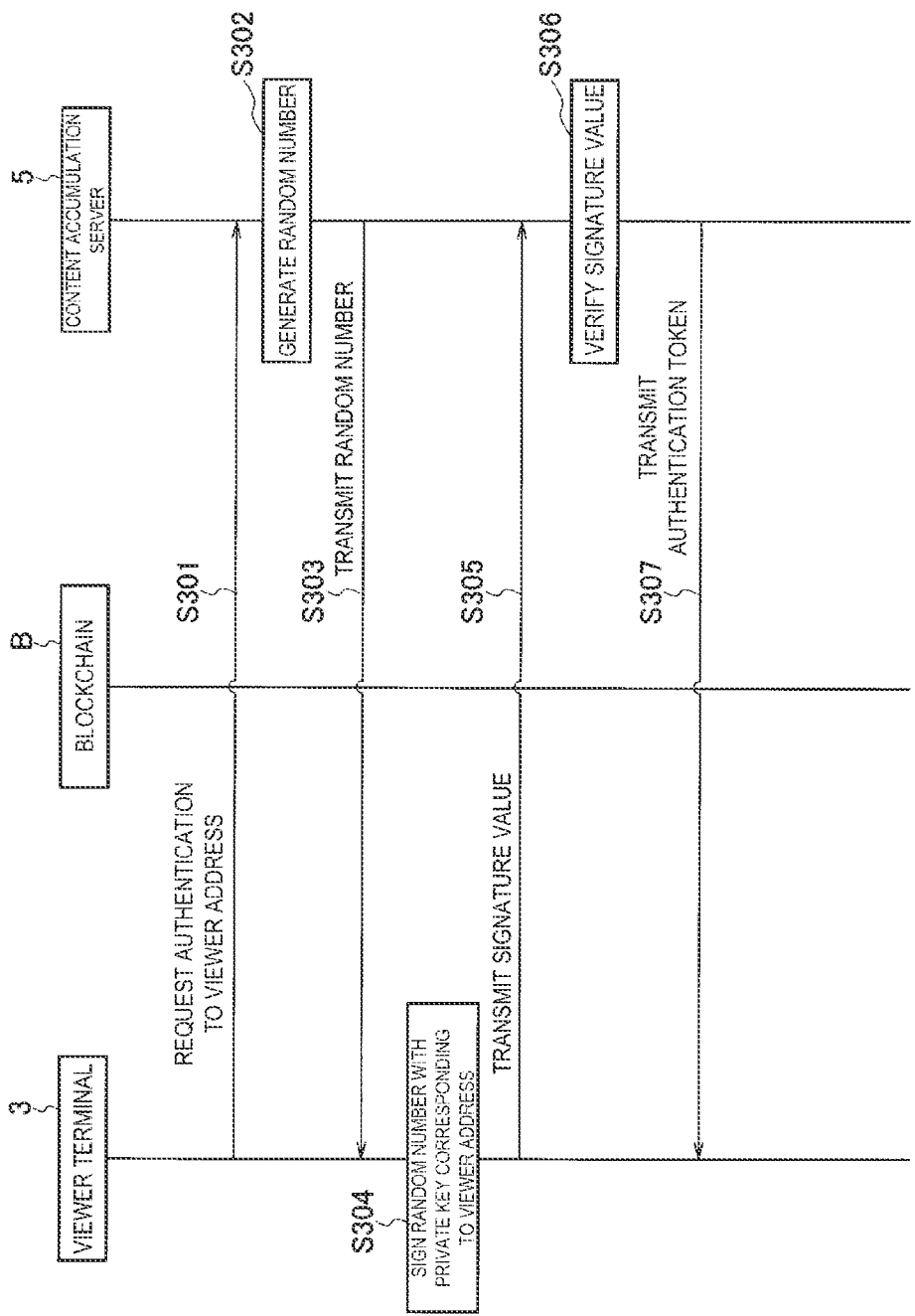
FIG. 10 is a sequence diagram illustrating a process for authenticating the assignee terminal by the content accumulation server in a challenge response scheme in the embodiment of the present invention.
Figure 11:
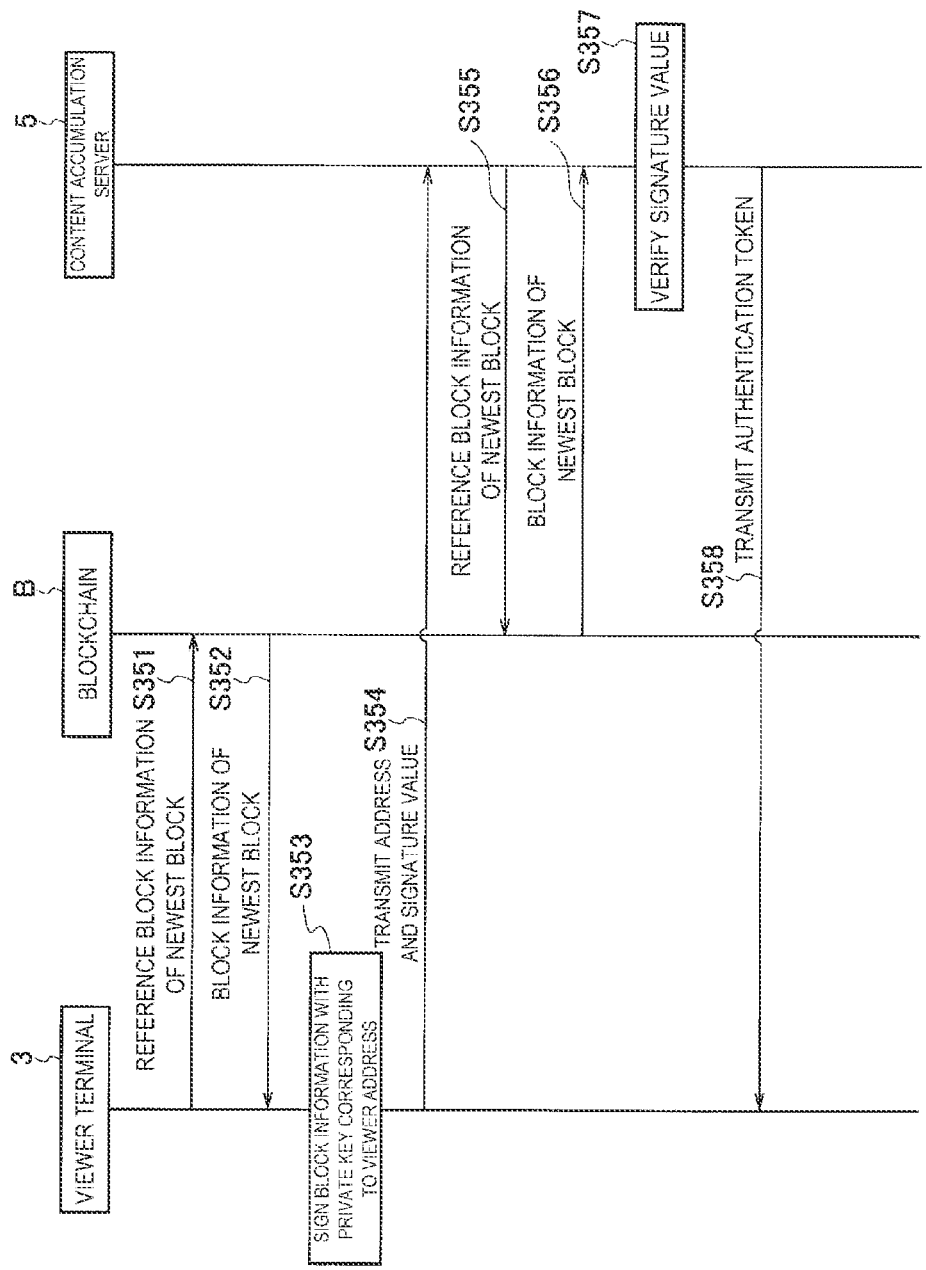
FIG. 11 is a sequence diagram illustrating a process for authenticating the assignee terminal by the content accumulation server in a time stamp scheme in the embodiment of the present invention.
Figure 12:
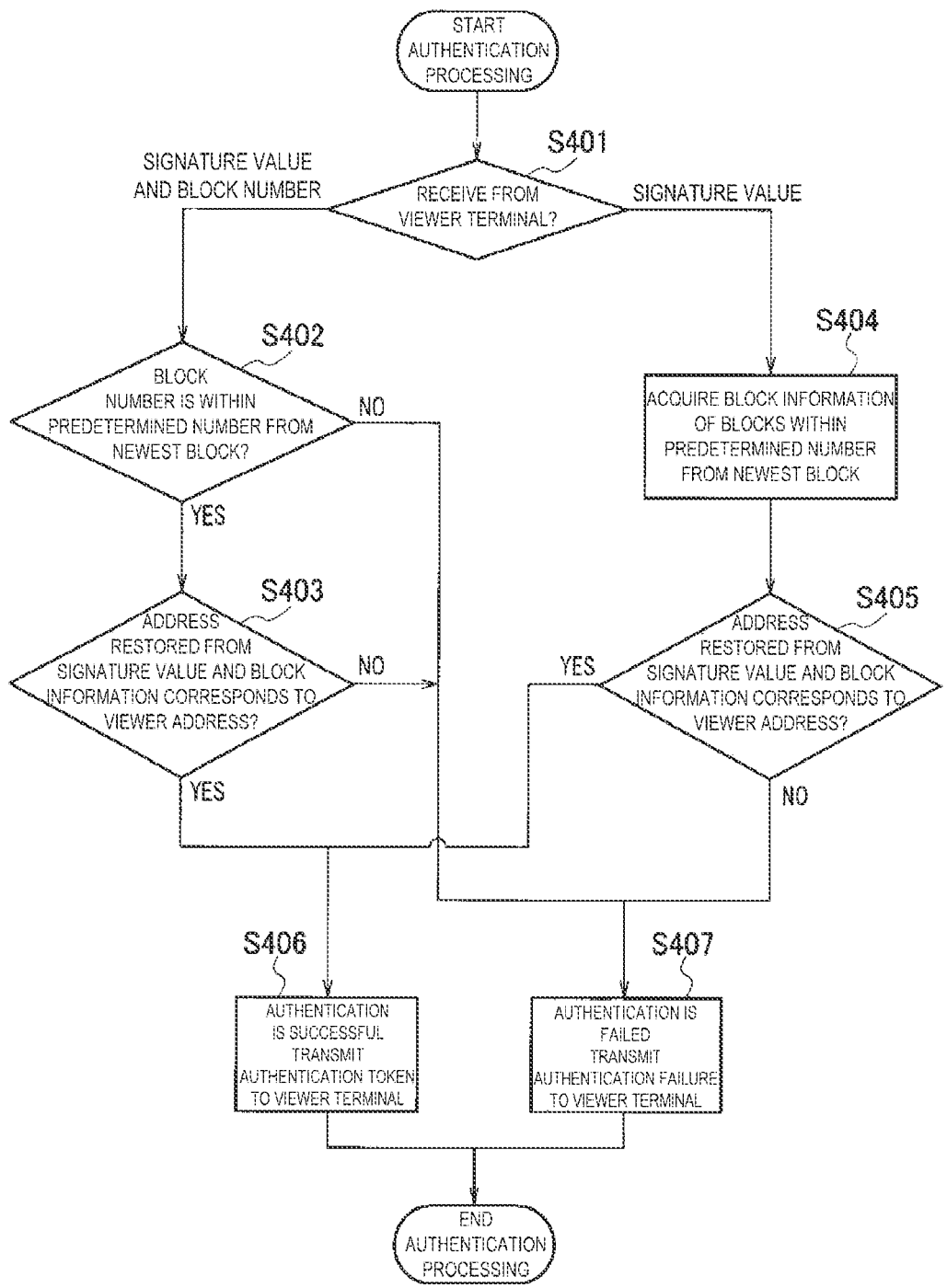
FIG. 12 is a flowchart illustrating the process for authenticating the assignee terminal by the content accumulation server in the time stamp scheme in the embodiment of the present invention.

With reference to FIGS. 10 to 12, processing will be described in which the content accumulation server 5 authenticates the viewer terminal 3. The viewer terminal 3 is a terminal used by a person to whom the viewing right for the content data C is licensed.

With reference to FIG. 10, processing for authenticating in the challenge response scheme will be described.

First, in step S301, the viewer terminal 3 accesses the content accumulation server 5 to transmit the address of the viewer and request authentication to the address of the viewer. The content accumulation server 5 generates a random string (random number) in step S302, and transmits the random number to the viewer terminal 3 in step S303.

In step S304, the viewer terminal 3 electronically signs the random number received from the content accumulation server 5 in the ECDSA scheme using a private key corresponding to the address of the viewer. In step S305, the viewer terminal 3 transmits a signature value acquired by the electronic signature in step S304 to the content accumulation server 5.

In step S306, the content accumulation server 5 verifies the signature value received in step S305. Specifically, the content accumulation server 5 utilizes the random number transmitted in step S303 and the signature value received in step S305 to restore the public key of the viewer and acquire the address of the viewer. In a case that the acquired address is confirmed to match the address transmitted by the viewer in step S301, the content accumulation server 5 determines that the authentication is successful.

In step S307, the content accumulation server 5 generates an authentication token indicating that the viewer is authenticated and transmits the authentication token to the viewer terminal 3. The authentication token may, for example, be a JSON Web Token (JWT), and when the viewer is authenticated thereafter, the viewer may be made to transmit the JWT for being authenticated.

With reference to FIG. 11, processing for authenticating in the time stamp scheme will be described.

The viewer terminal 3 accesses the blockchain B to reference the block information of the newest block in step S351, and acquires the block information of the newest block in step S352.

In step S353, the viewer terminal 3 signs the block information of the newest block acquired in step S352 with the private key corresponding to the address of the viewer. In step S354, the viewer terminal 3 transmits the address of the viewer and the signature value acquired by signing in step S353 to the content accumulation server 5. The address of the viewer transmitted here is the address of the viewer that is set in the token data. The public key of the viewer may be transmitted instead of the address of the viewer.

The content accumulation server 5 accesses the blockchain B to reference the block information of the newest block in step S355, and acquires the block information of the newest block in step S356.

In step S357, the content accumulation server 5 verifies the signature value acquired in step S354. The content accumulation server 5 restores the public key from the received signature value and the block information of the newest block acquired in step S356, and verifies whether the restored public key corresponds to the address of the viewer acquired in step S354. In a case that the restored public key corresponds to the address of the viewer acquired in step S354 (or matches the public key of the viewer), the content accumulation server 5 determines that the authentication is successful.

Here, after the viewer terminal 3 acquires the newest block information in step S352, a new block may be added by another terminal while the content accumulation server 5 acquires the newest block in step S355 in some cases. Accordingly, even in a case that the content accumulation server 5 fails in the authentication on the basis of the block information of the newest block, the content accumulation server 5 may verify the block back, such as attempting to authenticate again based on the block information immediately before the newest block. Here, the number of blocks verified back may be specified in advance, such as ten.

In step S354, the viewer terminal 3 may transmit an identifier of the block of the block information acquired by the viewer terminal 3 to the content accumulation server 5.

In this case, the content accumulation server 5 acquires the block information corresponding to the identifier of the block transmitted from the viewer terminal 3 in step S356, and verifies the signature value. In a case that an identifier of a block older than a predetermined threshold is set, such as in a case that the identifier of the block transmitted by the viewer terminal 3 is older by ten or more than an identifier of the newest block available by the content accumulation server 5, the content accumulation server 5 may not authenticate the viewer terminal 3.

In step S358, the content accumulation server 5 generates an authentication token indicating that the viewer is authenticated and transmits the authentication token to the viewer terminal 3. The authentication token may, for example, be a JWT, and when the viewer is authenticated thereafter, the viewer may be made to transmit the JWT for being authenticated.

The time stamp scheme described with reference to FIG. 11 can be implemented more securely and at a lower cost than the challenge response scheme described with reference to FIG. 10. Specifically, even if the private key of the viewer is leaked, the content accumulation server 5 may not authenticate a third party who has falsely acquired the private key in the absence of an environment in which the third party can access the blockchain B. Moreover, in the challenge response scheme, the content accumulation server 5 needs to issue a random number and maintain a session to wait for a signature value thereof, whereas in the time stamp scheme, the content accumulation server 5 does not need to wait for a response from the viewer terminal 3. Thus, the time stamp scheme can reduce the cost of maintaining the session compared to the challenge response scheme.

With reference to FIG. 12, authentication processing will be described in which the authentication unit 522 of the content accumulation server 5 authenticates the viewer terminal 3 in the time stamp scheme.

In response to reception of an authentication request from the viewer terminal 3 in step S401, in a case that the authentication request includes a signature value and a block number, in step S402, the authentication unit 522 determines whether the received block number is within a predetermined number from the newest block. In accordance with a determination that the received block number is within the predetermined number, the authentication processing proceeds to step S403, and in accordance with a determination that not within the predetermined number, the processing proceeds to step S407.

In step S403, the authentication unit 522 determines whether the address restored from the signature value and the block information corresponds to the address of the viewer. In accordance with a determination of corresponding, the authentication processing proceeds to step S406, and in accordance with a determination of not corresponding, the processing proceeds to step S407.

In response to reception of an authentication request from the viewer terminal 3 in step S401, in a case that the authentication request includes a signature value and does not include a block number, in step S404, the authentication unit 522 acquires block information of blocks within a predetermined number from the newest block. In step S405, the authentication unit 522 determines whether each address recovered from the signature value and each piece of block information corresponds to the address of the viewer. In accordance of corresponding, the authentication processing proceeds to step S406, and in accordance of not corresponding, the processing proceeds to step S407.

In step S406, the authentication unit 522 determines that the authentication of the viewer is successful, and transmits an authentication token to the viewer terminal 3. In step S407, the authentication unit 522 determines that the authentication of the viewer is failed, and transmits the authentication failure to the viewer terminal 3.

Note that the processing illustrated in FIG. 12 is an example, without limitation. For example, in step S404, the authentication unit 522 acquires the block information of the blocks within a predetermined number from the newest block, and determines whether each piece of block information includes block information corresponding to the signature value. In contrast, determination processing may be repeated at any time until a predetermined number of pieces of block information are acquired, such that whether the newest block information corresponds to the signature value is determined, and in a case of not corresponding, block information immediately before the newest block is acquired.

Content Delivery

Figure 13:
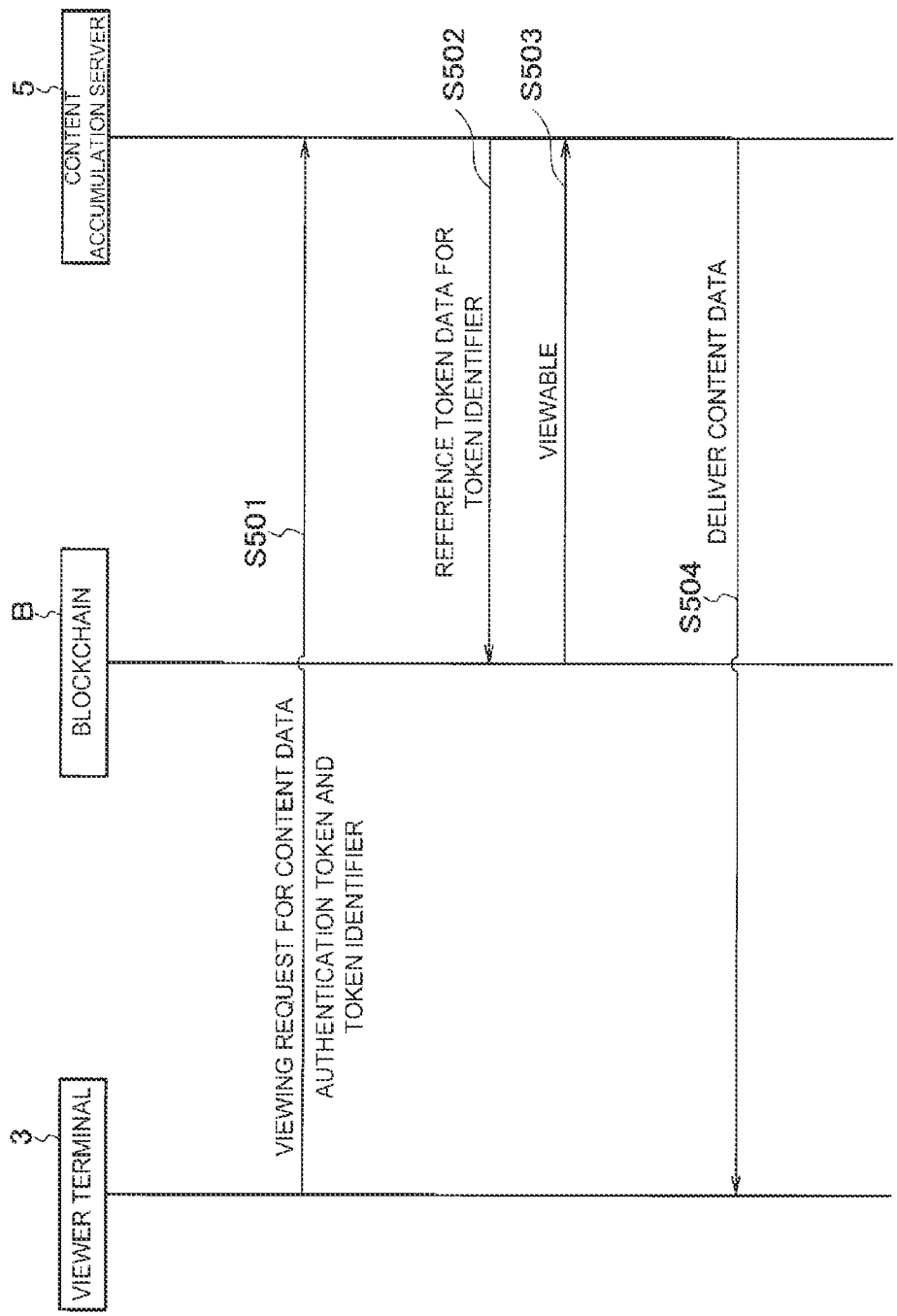
FIG. 13 is a sequence diagram illustrating a process for delivering content by the content accumulation server in the embodiment of the present invention.

With reference to FIG. 13, processing will be described in which the content accumulation server 5 delivers the content data C to the viewer terminal 3.

The viewer terminal 3 transmits a viewing request for the content data C in step S501. The viewing request includes a token identifier identifying the right to the content data C possessed by the viewer and the authentication token acquired by the processing in FIG. 10 or 11.

In step S502, the content accumulation server 5 references token data corresponding to the token identifier acquired from the blockchain B in step S501, and determines whether the address of the viewer is set in the referenced token data. Here, the viewer is licensed with the viewing right, and thus, the content accumulation server 5 determines whether the address of the viewer is set in the licensee information of the token data.

In a case that it is determined in step S503 that the address of the viewer is set in the referenced token data, the content accumulation server 5, in step S504, delivers the content data C to the viewer terminal 3. The delivered content data C is identified from the match information for the token data corresponding to the token identifier transmitted in step S501.

As described above, according to the embodiment of the present invention, the right to the content data C is made into a token and registered with the blockchain B, and the transfer or license of the right is also registered with the blockchain B by the update of the token. In utilizing the content data C, the content accumulation server 5 can check the token registered with the blockchain B to make a person having the legitimate use the content data C.

The right to the content data C being easily and appropriately recorded in the blockchain B in this manner enables that the compensation for the right to the content data C can be appropriately processed and returned to a copyright holder, a creator, or the like. This allows the content data C to be secondarily or tertiarily used under the legitimate right processing and so on such that the distribution of the content data can drastically develop.

As described above, the content contract system 9 according to the embodiment of the present invention can distribute the right to the content data using the blockchain B.

Other Embodiments

Although the embodiment of the present invention has been described above, it should not be understood that description and drawings that are parts of the disclosure are not intended to limit the present invention. Various alternative embodiments, examples, and running techniques will become apparent from the disclosure for those skilled in the art.

For example, the right holder terminal, the assignee terminal, the blockchain control terminal, and the content accumulation server described in the embodiment of the present invention may be configured on a single piece of hardware as illustrated in FIGS. 4 to 7, or may be configured on a plurality of pieces of hardware in accordance with functions and the number of processes thereof. Those terminals and server may be implemented on a known information processing system performing another process.

It is a matter of course that various embodiments and the like that are not described herein are also included in the present invention. Therefore, the technical scope of the present invention is defined merely by specific matters of the present invention related to the scope of claims that is reasonable from the above description.

REFERENCE SIGNS LIST

1 Right holder terminal
2 Assignee terminal (Deliverer terminal)
3 Assignee terminal (viewer terminal)
4 Blockchain control terminal
5 Content accumulation server
6 P2P network
7 Delivery network
9 Content contract system
110, 210, 310, 410, 510 Storage device
120, 220, 320, 420, 520 Processing device
121 Match information acquisition unit
122 Token issuance transaction transmission unit
123 Application collection transaction transmission unit
130, 230, 330, 430, 530 Communication control device
221 Application transaction transmission unit
421 Transaction processing unit
422 Token issuance unit
423 Application collection unit
521 Content registration unit
522 Authentication unit
523 Content providing unit
B Blockchain
Bb Blockchain body data
Bs State data
C Content data
Tb Viewing Right Token
Td Delivery right token

The invention claimed is:

1. A content contract system for distributing a right to content data, the content contract system comprising:
a right holder terminal configured to be used by a right holder having the right to the content data;
an assignee terminal configured to be used by an assignee to which the right is assigned from the right holder;
a control terminal configured to verify a transaction transmitted by the right holder terminal or the assignee terminal; and
a content accumulation server configured to be connected to the right holder terminal,
wherein the right holder terminal, the assignee terminal, and the control terminal are connected via a P2P network, and
store a distributed ledger, the distributed ledger including the transaction that is set with a smart contract program to distribute the right, and being synchronized among the right holder terminal, the assignee terminal, and the control terminal,
the right holder terminal includes:
a match information acquisition unit, including one or more processors, configured to transmit the content data to the content accumulation server, and acquire match information for the content data from the content accumulation server,
a token issuance transaction transmission unit, including the one or more processors, configured to transmit a token issuance transaction that issues token data including the match information and a type of the right to be distributed, and acquire a token identifier for identifying the token data, and
an application collection transaction transmission unit, including the one or more processors, configured to transmit an application collection transaction that includes the token identifier and collects an assignee of the right,
the assignee terminal includes an application transaction transmission unit, including the one or more processors, configured to transmit an application transaction that applies for the application collection transaction,
the control terminal includes a transaction processing unit, including the one or more processors, configured to process the transactions, and
the transaction processing unit includes
a token issuance unit, including one or more second processors, configured to make the token issuance transaction be included in the distributed ledger, generate the token data that includes the match information and the type of the right, and is set with an address of the right holder as owner information, and is identified by a token identifier, and register the token data corresponding to the token identifier in the distributed ledger,
an application collection unit, including the one or more second processors, configured to make the application collection transaction be included in the distributed ledger, and
an application unit, including the one or more second processors, configured to make the application transaction be included in the distributed ledger, and change the owner information of the token data corresponding to the token identifier of the distributed ledger from the address of the right holder terminal to an address of the assignee,
wherein the content accumulation server is configured to:
verify the address of the assignee;
not connect to the P2P network; and
deliver the content data to the verified address of the assignee, and
wherein the content accumulation server further includes an authentication unit, including one or more third processors, configured to transmit a random number to the assignee terminal in response to reception of an authentication request of the assignee from the assignee terminal, receive, from the assignee terminal, a signature value given the random number signed with a private key corresponding to the address of the assignee, and verify the signature value based on the random number, the signature value, and the address of the assignee.

2. The content contract system according to claim 1, wherein a content providing unit, including one or more third processors, of the content accumulation server is configured to provide the content data with information corresponding to the address of the assignee set in the owner information of the token data.

3. The content contract system according to claim 1, wherein the content accumulation server includes a content registration unit, including one or more third processors, configured to receive the content data and calculate the match information for the content data, and the content registration unit is configured to calculate a value of features of the content data as the match information.

4. The content contract system according to claim 1, wherein in a case that the right is the right for use of the content data, the token data includes an identifier of a sharer by which a compensation obtained by the use is shared and a profit-sharing ratio of each sharer.

5. The content contract system according to claim 1, wherein in a case that the right is the right for licensing a predetermined right, the token data includes licensee information set with an address of a licensee.

6. The content contract system according to claim 1, wherein the content accumulation server includes a content providing unit, including one or more third processors, configured to, in response to reception of the token identifier from the assignee terminal, reference the owner information corresponding to the token identifier in the distributed ledger, and in a case that the owner information is set with the address of the assignee, provide the content data to the assignee terminal.

7. The content contract system according to claim 1, wherein the distributed ledger is formed by coupling a plurality of blocks in a chain, and the content accumulation server further includes an authentication unit, including one or more third processors, configured to receive, from the assignee terminal, a signature value given block information of the newest block signed with a private key corresponding to the address of the assignee, and verify the signature value based on the block information of each of a predetermined number of most recent blocks, the signature value, and the address of the assignee.

8. The content contract system according to claim 7, wherein the authentication unit, in response to further receiving an identifier of the newest block from the assignee terminal, is configured to check that the identifier of the newest block received from the assignee terminal is an identifier of a block within a predetermined number of blocks from the newest block, and verify the signature value based on the block information of the block corresponding to the identifier of the received newest block, the signature value, and the address of the assignee.

9. A content contract method used for a content contract system, the content contract system being for distributing a right to content data, the content contract system including a right holder terminal used by a right holder having the right to the content data, an assignee terminal used by an assignee to which the right is assigned from the right holder, a control terminal verifying a transaction transmitted by the right holder terminal or the assignee terminal, and a content accumulation server connecting to the right holder terminal, and the right holder terminal, the assignee terminal, and the control terminal are connected via a P2P network, and a distributed ledger is stored, the distributed ledger including the transaction that is set with a smart contract program to distribute the right, and being synchronized among the right holder terminal, the assignee terminal, and the control terminal, the content contract method comprising:

at the right holder terminal, transmitting the content data to the content accumulation server, and acquiring match information for the content data from the content accumulation server;

at the right holder terminal, transmitting a token issuance transaction that issues token data including the match information and a type of the right to be distributed;

at the control terminal, in making the token issuance transaction be included in the distributed ledger, generating the token data that includes the match information and the type of the right, and is set with an address of the right holder as owner information, and is identified by a token identifier, and registering the token data corresponding to the token identifier in the distributed ledger;

at the right holder terminal, acquiring the token identifier that identifies the token data;

at the right holder terminal, transmitting an application collection transaction that including the token identifier and collects an assignee of the right;

at the control terminal, publishing the application collection transaction in making the application collection transaction be included in the distributed ledger;

at the assignee terminal, transmitting an application transaction that applies for the application collection transaction;

at the control terminal, in making the application transaction be included in the distributed ledger, changing the owner information of the token data corresponding to the token identifier of the distributed ledger from the address of the right holder to an address of the assignee;

at the content accumulation server, verifying the address of the assignee and does not connect to the P2P network;

at the content accumulation server, delivering the content data to the verified address of the assignee; and at the content accumulation server, transmitting a random number to the assignee terminal in response to reception of an authentication request of the assignee from the assignee terminal and receiving, from the assignee terminal, a signature value given the random number signed with a private key corresponding to the address of the assignee, and verifying the signature value based on the random number, the signature value, and the address of the assignee.

10. A control terminal used for a content contract system, the content contract system being for distributing a right to content data, the content contract system including a right holder terminal configured to be used by a right holder having the right to the content data, an assignee terminal configured to be used by an assignee to which the right is assigned from the right holder, the control terminal configured to verify a transaction transmitted by the right holder terminal or the assignee terminal, and a content accumulation server configured to be connected to the right holder terminal, and the right holder terminal, the assignee terminal, and the control terminal being connected via a P2P network, and a distributed ledger being stored, the distributed ledger including the transaction that is set with a smart contract program to distribute the right, and being synchronized among the right holder terminal, the assignee terminal, and the control terminal, the control terminal comprising:
a transaction processing unit, including one or more processors, configured to process the transactions, wherein the transaction processing unit includes a token issuance unit, including the one or more processors, configured to make a token issuance transaction be included in the distributed ledger, the token issuance transaction issuing token data including match information for the content data and a type of the right to be distributed, generate the token data that includes the match information and the type of the right, and is set with an address of the right holder as owner information, and is identified by a token identifier, and register the token data corresponding to the token identifier in the distributed ledger, an application collection unit, including the one or more processors, configured to make an application collection transaction be included in the distributed ledger, the application collection transaction being transmitted by the right holder terminal and including a token identifier for identifying the token data that includes the match information for the content data and the type of the right to be distributed, and an application unit, including the one or more processors, configured to make the application transaction that applies for the application collection transaction be included in the distributed ledger, and change the owner information of the token data corresponding to the token identifier of the distributed ledger from the address of the right holder to an address of the assignee, wherein the content accumulation server is configured to:
verify the address of the assignee;
not connect to the P2P network; and
deliver the content data to the verified address of the assignee, and wherein the content accumulation server further includes an authentication unit, including one or more third processors, configured to transmit a random number to the assignee terminal in response to reception of an authentication request of the assignee from the assignee terminal, receive, from the assignee terminal, a signature value given the random number signed with a private key corresponding to the address of the assignee, and verify the signature value based on the random number, the signature value, and the address of the assignee.

* * * * *